United States Patent [19]
Kondo et al.

[11] Patent Number: 5,532,615
[45] Date of Patent: Jul. 2, 1996

[54] INSPECTING METHOD, INSPECTING APPARATUS, AND DEFECT CORRECTING METHOD

[75] Inventors: Naofumi Kondo, Nara; Mikio Katayama, Ikoma; Masaya Okamoto, Soraku-gun; Makoto Miyago, Higashiosaka; Kiyoshi Nakazawa, Fujiidera; Yuzuru Kanemori; Makoto Tachibana, both of Nara, all of Japan

[73] Assignee: Sharp Kabushiki Kaisha, Osaka, Japan

[21] Appl. No.: 158,843

[22] Filed: Nov. 24, 1993

[30] Foreign Application Priority Data

Nov. 25, 1992 [JP] Japan ..................... 4-315417

[51] Int. Cl.⁶ ........................... G01R 31/02
[52] U.S. Cl. ........................... 324/770; 324/537
[58] Field of Search ................ 324/158 R, 678, 324/158 F, 537, 770

[56] References Cited

U.S. PATENT DOCUMENTS 5,235,272  8/1993  Henley ............... 324/158 R

FOREIGN PATENT DOCUMENTS 58-184758  10/1983  Japan .
1-144092    6/1989  Japan .

*Primary Examiner*—Kenneth A. Wieder
*Assistant Examiner*—Mark Wardas
*Attorney, Agent, or Firm*—David G. Conlin; Milton Oliver

[57] ABSTRACT

This invention provides an inspecting method, an inspecting apparatus, and a defect correcting method, for an active matrix substrate including: a gate bus line; a source bus line; a pixel electrode; a switching element for driving the pixel electrode; and a pair of electrodes constituting an auxiliary capacitance. The inspecting method includes: a step of disposing a counter substrate having a face on which a counter electrode is formed so that the face faces the active matrix substrate with a liquid crystal layer interposed therebetween, and connecting signal supplying terminals to gate bus lines and source bus lines and the counter electrode; and a detection step of detecting a defect on the active matrix substrate by performing at least one of a first signal generating step, a second signal generating step, and a third signal generating step. The first, second, and third signal generating steps all include alternately applying an ON signal for turning on the switching element and an OFF signal for turning off the switching element to the gate bus line. The first signal generating step includes applying a first detecting signal having a voltage which changes before the ON signal is applied to the source bus line. The second signal generating step includes applying a second detecting signal having a voltage which changes before and after the ON signal is applied. The third signal generating step includes applying a third detecting signal having a voltage which changes after the ON signal is applied.

12 Claims, 21 Drawing Sheets

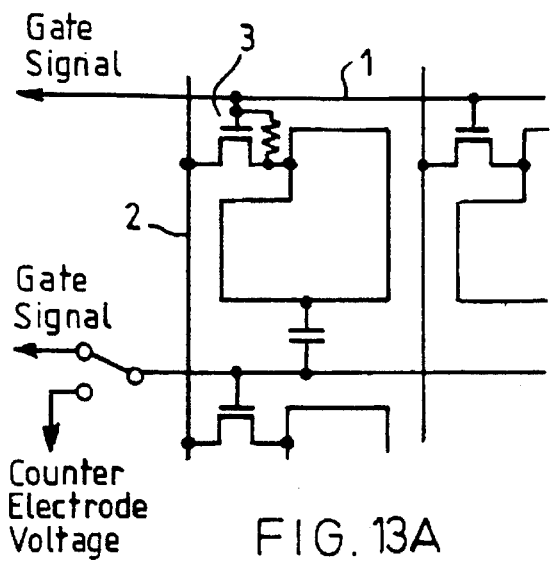
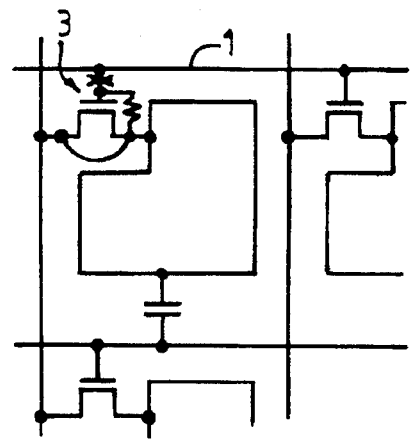
FIG. 13A
FIG. 13B
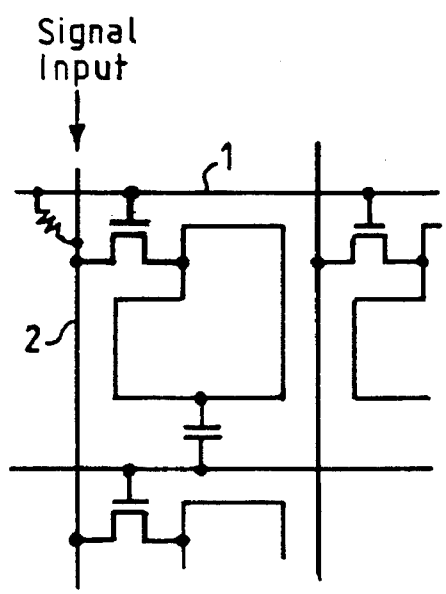
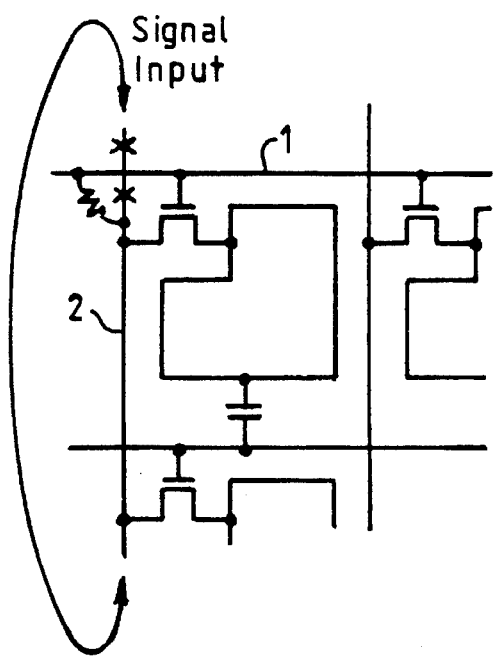
FIG. 14A
FIG. 14B

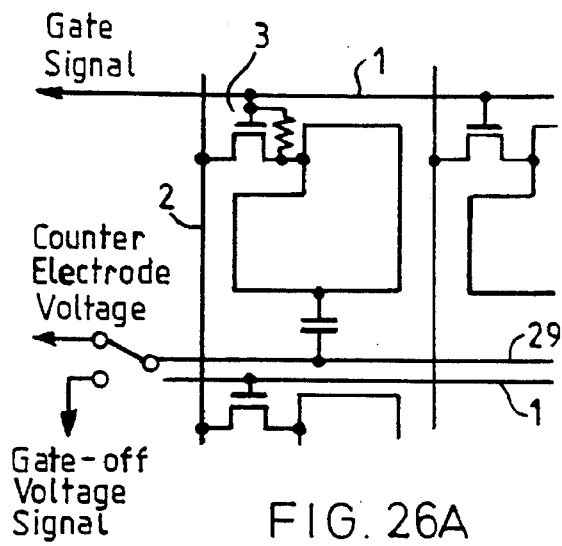
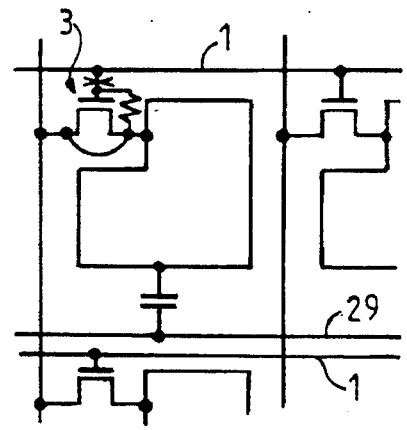
FIG. 26A  FIG. 26B
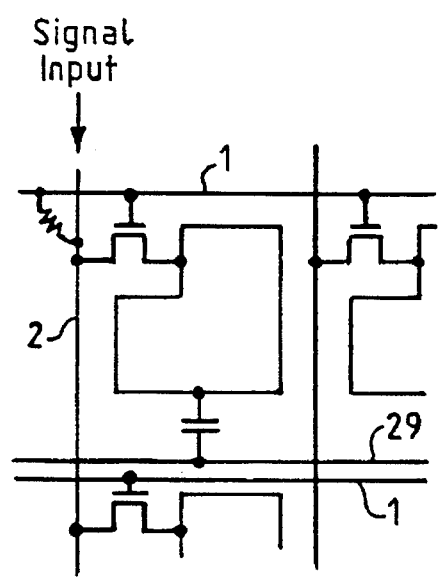
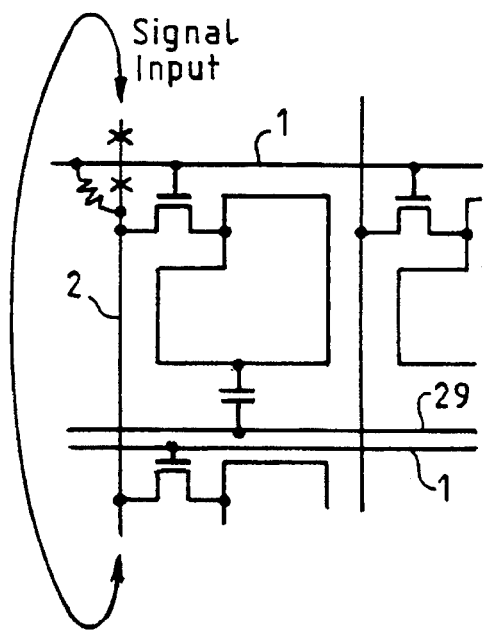
FIG. 27A  FIG. 27B

PRIOR ART

PRIOR ART

PRIOR ART 5,532,615

INSPECTING METHOD, INSPECTING APPARATUS, AND DEFECT CORRECTING METHOD

BACKGROUND OF THE INVENTION

1. Field of the Invention

The present invention relates to an inspecting method, an inspecting apparatus, and a defect correction method, all for an active matrix substrate which constitutes a display apparatus in conjunction with a display medium such as liquid crystal.

2. Description of the Related Art

In an active matrix method, pixel electrodes are disposed in a matrix form on an insulating substrate, and the respective pixel electrodes are independently driven. The active matrix method is practically used for a display apparatus such as a liquid crystal television, a word processor display, or a terminal display apparatus in a computer. As a switching element for driving each pixel electrode, a thin film transistor (TFT) device, a metal-insulator-metal (MIM) device, an MOS transistor device, a diode, a varistor, and the like are generally known.

FIG. 29 is a schematic circuit diagram of an active matrix substrate utilizing a TFT as a switching element. FIG. 30 is a partially enlarged view of the active matrix substrate shown in FIG. 29. An active matrix display apparatus is constructed of the active matrix substrate, a counter substrate disposed so as to face the active matrix substrate, and a liquid crystal layer interposed between the active matrix substrate and the counter substrate. On an insulating substrate of the active matrix substrate, a plurality of gate bus lines 1 as scanning lines are disposed in parallel. A plurality of source bus lines 2 as signal lines are disposed in parallel so as to cross the gate bus lines 1. In the vicinity of each of the crossings of the gate bus lines 1 and the source bus lines 2, a TFT 3 is disposed. The TFT 3 is connected to a pixel electrode 4 which is provided in a rectangular area defined by the adjoining gate bus lines 1 and source bus lines 2.

On a face of the counter substrate which faces the active matrix substrate and is in contact with the liquid crystal layer, counter electrodes 5 are formed. Between a counter electrode 5 and the corresponding pixel electrode 4, a pixel capacitance $C_{LC}$ is formed.

An auxiliary capacitance $(C_S)$ 6 is provided in parallel with the pixel capacitance $C_{LC}$. One of the electrodes of the auxiliary capacitance 6 is connected to the pixel electrode 4. The other electrode thereof is connected to a gate bus line 1 to which a pixel electrode 4 which is adjacent to the pixel electrode 4 connected to the former electrode is connected via a TFT 3. That is, the above-described active matrix substrate has a so-called Cs-On-Gate structure.

In a conventional inspecting method for detecting a defect in the active matrix substrate having the Cs-On-Gate structure, signals A1, A2, B, and C shown in FIG. 31 are used. The signal A1 is supplied to odd-numbered gate bus lines 1 via line 7 shown in FIG. 29. The signal A2 is supplied to even numbered gate bus lines 1 via line 8 shown in FIG. 29. These signals A1 and A2 control the ON/OFF states of the TFTs 3 by changing voltages applied to the gate electrodes of the TFTs 3 which are connected to the respective pixel electrodes 4. The signal B is supplied to the source bus lines 2 via line 9, and written into the respective pixel electrodes 4 by the TFTs 3. The voltage level of the signal B is maintained after it is written in the respective pixel electrodes 4 until a new signal is written in the next frame. The signal C is supplied to the counter electrodes 5 on the counter substrate, and it is fixed to an optimum voltage level.

FIG. 32 is a schematic circuit diagram showing an active matrix substrate having a construction different from that of FIG. 29. FIG. 33 is a partially enlarged view of the active matrix substrate. The active matrix substrate is disposed so as to face a counter substrate, the same as the active matrix substrate shown in FIG. 29. An active matrix display apparatus is constructed of the active matrix substrate, the counter substrate, and a liquid crystal layer which is interposed between these substrates. On an insulating substrate of the active matrix substrate, a plurality of gate bus lines 1 as scanning lines are disposed in parallel. A plurality of source bus lines 2 as signal lines are disposed in parallel so as to cross the gate bus lines 1. In the vicinity of each of the crossings of the gate bus lines 1 and the source bus lines 2, a TFT 3 is disposed. The TFT 3 is connected to a pixel electrode 4 which is provided in a rectangular area defined by the adjoining gate bus lines 1 and source bus lines 2.

On a face of the counter substrate which faces the active matrix substrate and is in contact with the liquid crystal layer, counter electrodes 5 are formed. Between a counter electrode 5 and the corresponding pixel electrode 4, a pixel capacitance $C_{LC}$ is generated.

An auxiliary capacitance $(C_S)$ 6 is provided in parallel with the pixel capacitance $C_{LC}$. One of the electrodes of the auxiliary capacitance 6 is connected to the pixel electrode 4. The other electrode thereof is connected to an auxiliary capacitance common line 29. That is, the above-described active matrix substrate shown in FIG. 32 has a so-called Cs-On-Common structure.

In a conventional inspecting method for detecting a defect in the active matrix substrate having the Cs-On-Common structure, signals A3, B, and C shown in FIG. 34 are used. The signal A3 is supplied to gate bus lines 1 via line 28 shown in FIG. 32. The signal A3 controls the ON/OFF states of the TFTs 3 by changing voltages applied to the gate electrodes of the TFTs 3 which are connected to the respective pixel electrodes 4. The signal B is supplied to the source bus lines 2 via line 9. The voltage level of the signal B is maintained after the signal B is written into the respective pixel electrodes 4 until a new signal is written in the next frame. The signal C is supplied to the counter electrodes 5 on the counter substrate, and it is fixed to an optimum voltage level.

However, according to the above-mentioned conventional inspecting methods, even if there occur some defects in the active matrix substrate having the Cs-On-Gate structure shown in FIG. 29 or in the active matrix substrate having the Cs-On-Common structure shown in FIG. 32, some of the defects cannot be detected. Even in a case where the defects can be detected, the types of the defects cannot be specified.

For example, according to the conventional inspecting methods, a defect due to ON failure, i.e., the poor ON characteristics of a TFT 3 can be detected based on the shape of the rising edge d of the waveform D indicative of the potential of the drain electrode when an inspecting signal is supplied to the source bus line 2. The waveform D indicative of the potential of the drain electrode and the rising edge d are shown by broken lines in FIGS. 31 and 34. FIG. 31 shows the case of the active matrix substrate having the Cs-On-Gate structure. FIG. 34 shows the case of the active matrix substrate having the Cs-On-Common structure.

However, as described above, the voltage level of the signal B is maintained after the signal B is written into respective pixels by the TFTs 3 until a new signal is written thereinto in the next frame. This means that the voltage level of the signal B is maintained even when the OFF characteristics of a TFT 3 are deteriorated due to a leakage between the source electrode and the drain electrode of the TFT 3. Accordingly, a defect due to OFF failure of the TFT 3 cannot be detected. Also in a case where a leakage occurs in another portion, for example, between the pixel electrode 4 and the source bus line 2 or the like, a defect due to leakage cannot be detected for the above-mentioned reasons.

As described above, the voltage level of the signal C supplied to the counter electrodes 5 is fixed to the optimum counter voltage level. Accordingly, a defect due to leakage caused by metallic dust or the like between the counter electrode 5 and the pixel electrode 4 and a defect due to leakage caused by insulation failure between a pair of electrodes of the auxiliary capacitance 6 can be detected. However, the above defects cannot be distinguished from a defect due to OFF failure caused by an insulation failure between the source electrode and the drain electrode of the TFT 3.

As described above, according to the conventional inspecting methods, a defect due to OFF failure caused by a leakage between the source electrode and the drain electrode of the TFT 3, and defects due to leakage caused between the pixel electrode 4 and the source bus line 2, between the counter electrode 5 and the pixel electrode 4, and between the electrodes of the auxiliary capacitance 6 could not be detected. In a case where defects on the active matrix substrate could be detected, a defect due to OFF failure could not be distinguished from a defect due to leakage. Furthermore, portions of the detected defects could not be specified on the active matrix substrate, so that the defects could not be substantially corrected. This results in a problem in the reduction of yield.

SUMMARY OF THE INVENTION

The inspecting method of this invention is applied for an active matrix substrate including: an insulating substrate; a first line formed on the insulating substrate; a second line crossing the first line; a pixel electrode provided in an area enclosed by the first line, an adjacent first line thereto, the second line, and an adjacent second line thereto; a switching element for driving the pixel electrode connected to the pixel electrode and the first line; and a pair of electrodes constituting an auxiliary capacitance, one of the pair of electrodes being connected to the pixel electrode, the other one being connected to the adjacent first line. The method includes: a step of disposing a counter substrate having a face on which a counter electrode is formed so that the face faces the active matrix substrate with a liquid crystal layer interposed therebetween, and connecting signal supplying terminals to the first line, the adjacent first line, the second line, and the counter electrode; and a detection step of detecting a defect on the active matrix substrate by performing at least one of a first signal generating step, a second signal generating step, and a third signal generating step, the first signal generating step including alternately applying an ON signal for turning on the switching element and an OFF signal for turning off the switching element to the first line, and applying a first detecting signal having a voltage which changes before the ON signal is applied to the second line, the second signal generating step including alternately applying the ON signal and the OFF signal to the first line, and applying a second detecting signal having a voltage which changes before and after the ON signal is applied, the third signal generating step including alternately applying the ON signal and the OFF signal following the ON signal to the first line, and applying a third detecting signal having a voltage which changes after the ON signal is applied.

In one embodiment of the invention, the detection step includes detecting a defect on the active matrix substrate by additionally performing at least one of a fourth signal generating step, a fifth signal generating step, and a sixth signal generating step, the fourth signal generating step including applying a fourth detecting signal having the voltage of the ON signal applied to the first line to the counter electrode, the fifth signal generating step including applying a fifth detecting signal having the voltage of the OFF signal applied to the first line to the counter electrode, the sixth signal generating step including electrically connecting the adjacent first line to the counter electrode and applying a sixth detecting signal having a voltage changing between the voltage of the ON signal and the voltage of the OFF signal to the adjacent first line.

In another embodiment of the invention, the first line and the adjacent first line are both scanning lines, and the second line and the adjacent second line are both signal lines.

In another embodiment of the invention, the first line is a scanning line, the adjacent first line is a common line to which the other electrode of the auxiliary capacitance is connected, and the second line and the adjacent second line are both signal lines.

The defect correcting method of the invention is applied for an active matrix substrate including: an insulating substrate; a first line formed on the insulating substrate; a second line crossing the first line; a pixel electrode provided in an area enclosed by the first line, an adjacent first line thereto, the second line, and an adjacent second line thereto; a switching element for driving the pixel electrode connected to the pixel electrode and the first line; and a pair of electrodes constituting an auxiliary capacitance, one of the pair of electrodes being connected to the pixel electrode, the other one being connected to the adjacent first line. The method includes: a step of disposing a counter substrate having a face on which a counter electrode is formed so that the face faces the active matrix substrate with a liquid crystal layer interposed therebetween, and connecting signal supplying terminals to the first line, the adjacent first line, the second line, and the counter electrode; a detection step of detecting a defect on the active matrix substrate by performing at least one of a first signal generating step, a second signal generating step, and a third signal generating step, the first signal generating step including alternately applying an ON signal for turning on the switching element and an OFF signal for turning off the switching element to the first line, and applying a first detecting signal having a voltage which changes before the ON signal is applied to the second line, the second signal generating step including alternately applying the ON signal and the OFF signal to the first line, and applying a second detecting signal having a voltage which changes before and after the ON signal is applied, the third signal generating step including alternately applying the ON signal and the OFF signal following the ON signal to the first line, and applying a third detecting signal having a voltage which changes after the ON signal is applied; and a correction step of correcting the detected defect.

In one embodiment of the invention, the detection step includes detecting a defect on the active matrix substrate by additionally performing at least one of a fourth signal generating step, a fifth signal generating step, and a sixth signal generating step, the fourth signal generating step including applying a fourth detecting signal having the voltage of the ON signal applied to the first line to the counter electrode, the fifth signal generating step including applying a fifth detecting signal having the voltage of the OFF signal applied to the first line to the counter electrode, the sixth signal generating step including electrically connecting the adjacent first line to the counter electrode and applying a sixth detecting signal having a voltage changing between the voltage of the ON signal and the voltage of the OFF signal to the adjacent first line.

In another embodiment of the invention, the first line and the adjacent first line are both scanning lines, and the second line and the adjacent second line are both signal lines.

In another embodiment of the invention, the first line is a scanning line, the adjacent first line is a common line to which the other electrode of the auxiliary capacitance is connected, and the second line and the adjacent second line are both signal lines.

The inspecting apparatus of the invention is applied for an active matrix substrate including: an insulating substrate; a first line formed on the insulating substrate; a second line crossing the first line; a pixel electrode provided in an area enclosed by the first line, an adjacent first line thereto, the second line, and an adjacent second line thereto; a switching element for driving the pixel electrode connected to the pixel electrode and the first line; and a pair of electrodes constituting an auxiliary capacitance, one of the pair of electrodes being connected to the pixel electrode, the other one being connected to the adjacent first line. The apparatus includes: a counter substrate having a face on which a counter electrode is formed, the counter substrate being disposed so that the face faces the active matrix substrate; a liquid crystal layer formed on the face of the counter substrate, and, in use, interposed between the counter substrate and the active matrix substrate; ON/OFF signal generating means for generating an ON signal and an OFF signal applied to the first line and the adjacent first line, the ON signal turning on the switching element, the OFF signal turning off the switching element, the OFF signal following the ON signal; first signal generating means for generating a first detecting signal applied to the second line, the first detecting signal having a voltage which changes before the ON signal is applied; second signal generating means for generating a second detecting signal applied to the second line, the second detecting signal having a voltage which changes before and after the ON signal is applied; and third signal generating means for generating a third detecting signal applied to the second line, the third detecting signal having a voltage which changes after the ON signal is applied.

In one embodiment of the invention, the inspecting apparatus further includes: fourth signal generating means for generating a fourth detecting signal having the voltage of the ON signal, the fourth detecting signal being applied to the counter electrode, fifth signal generating means for generating a fifth detecting signal having the voltage of the OFF signal, the fifth detecting signal being applied to the counter electrode, and sixth signal generating means for electrically connecting the adjacent first line to the counter electrode and for generating a sixth detecting signal having a voltage changing between the voltage of the ON signal and the voltage of the OFF signal, the sixth detecting signal being applied to the adjacent first line.

In another embodiment of the invention, the first line and the adjacent first line are both scanning lines, and the second line and the adjacent second line are both signal lines.

In another embodiment of the invention, the first line is a scanning line, the adjacent first line is a common line to which the other electrode of the auxiliary capacitance is connected, and the second line and the adjacent second line are both signal lines.

Thus, the invention described herein makes possible the advantages of (1) providing an inspecting method and an inspecting apparatus for an active matrix substrate having a Cs-On-Gate structure or a Cs-On-Common structure, which can detect defects which could not be detected and can specify types and portions of the defects, and (2) providing a defect correction method by which defects can be corrected depending on the types of the defects.

These and other advantages of the present invention will become apparent to those skilled in the art upon reading and understanding the following detailed description with reference to the accompanying figures.

BRIEF DESCRIPTION OF THE DRAWINGS

FIG. 13A is a schematic diagram showing a pixel defect due to leakage between the gate and the source of a TFT on the active matrix substrate having a Cs-On-Gate structure.

FIG. 13B is a schematic diagram showing the corrected portion.

FIG. 14A is a schematic diagram showing a line defect due to leakage between the gate bus line and the source bus line on the active matrix substrate having a Cs-On-Gate structure.

FIG. 14B is a schematic diagram showing the corrected portion.

FIG. 26A is a schematic diagram showing a pixel defect due to leakage between the gate and the source of a TFT on the active matrix substrate having a Cs-On-Common structure.

FIG. 26B is a schematic diagram showing the corrected portion.

FIG. 27A is a schematic diagram showing a line defect due to leakage between the gate bus line and the source bus line on the active matrix substrate having a Cs-On-Common structure.

FIG. 27B is a schematic diagram showing the corrected portion.

DESCRIPTION OF THE PREFERRED EMBODIMENTS

Hereinafter, the present invention will be described by way of illustrative examples.

Example 1

Figure 1:
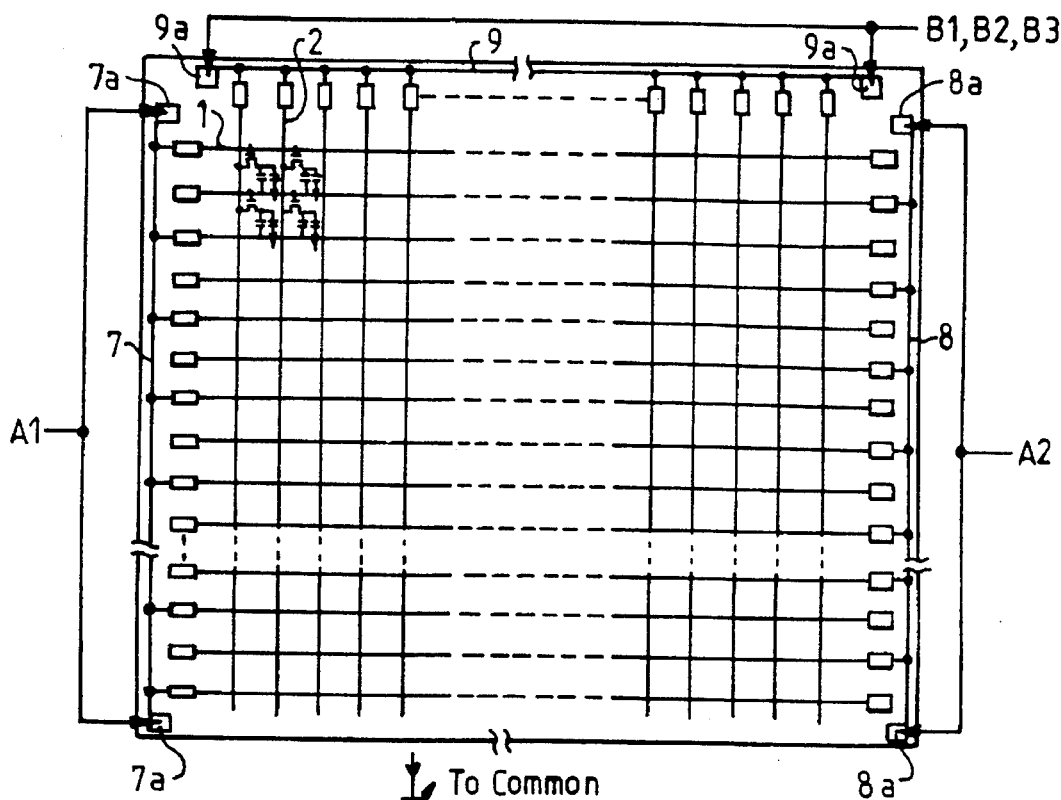
FIG. 1 is a plan view of an entire active matrix substrate having a Cs-On-Gate structure to which an inspecting method for an active matrix substrate according to the first example of the invention is applied.
Figure 2:
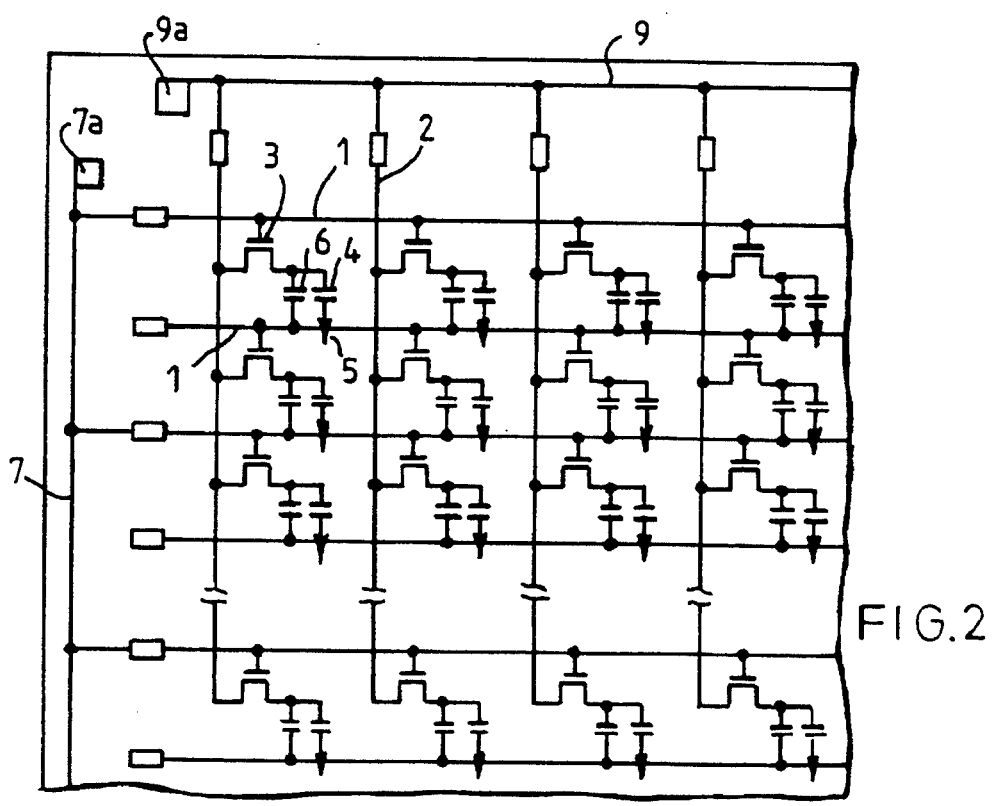
FIG. 2 is a plan view showing part of the active matrix substrate of FIG. 1.

FIG. 1 shows a construction of an entire active matrix substrate utilizing TFTs as switching elements. FIG. 2 shows part of the active matrix substrate. On an insulating substrate of the active matrix substrate, a plurality of gate bus lines 1 as scanning lines are disposed in parallel. A plurality of source bus lines 2 as signal lines are disposed in parallel so as to cross the gate bus lines 1. In the vicinity of each of the crossings of the gate bus lines 1 and the source bus lines 2, a TFT 3 is disposed. The gate electrode of each TFT 3 is connected to the gate bus line 1. The drain electrode of each TFT 3 is connected to a pixel electrode 4. The pixel electrodes 4 are disposed in a matrix on the insulating substrate, and the gate bus lines 1 and the source bus lines 2 are provided along the periphery of the pixel electrodes 4. An auxiliary capacitance ($C_S$) 6 is provided between the drain electrode of the TFT 3 and a gate bus line 1 which is adjacent, via the pixel electrode 4 connected to the drain electrode of the TFT 3, to another gate bus line 1 to which the gate electrode of the TFT 3 is connected. That is, the active matrix substrate has a so-called Cs-On-Gate structure.

Odd-numbered gate bus lines 1 are connected to each other via line 7. The line 7 is provided with terminals 7a on both the ends thereof. Also, even-numbered gate bus lines 1 are connected to each other via line 8. The line 8 is provided with terminals 8a on both the ends thereof. One end of each of the source bus lines 2 is connected to line 9. The line 9 is provided with terminals 9a on both the ends thereof.

When a counter substrate on which a liquid crystal layer and counter electrodes are previously formed is disposed so that the liquid crystal layer is adjacent to the active matrix substrate having the above-mentioned structure, a pixel capacitance ($C_{LC}$) is generated between the counter electrode 5 which is previously formed on a side of the counter substrate adjacent to the liquid crystal layer and the corresponding pixel electrode 4 on the active matrix substrate.

Figure 3:
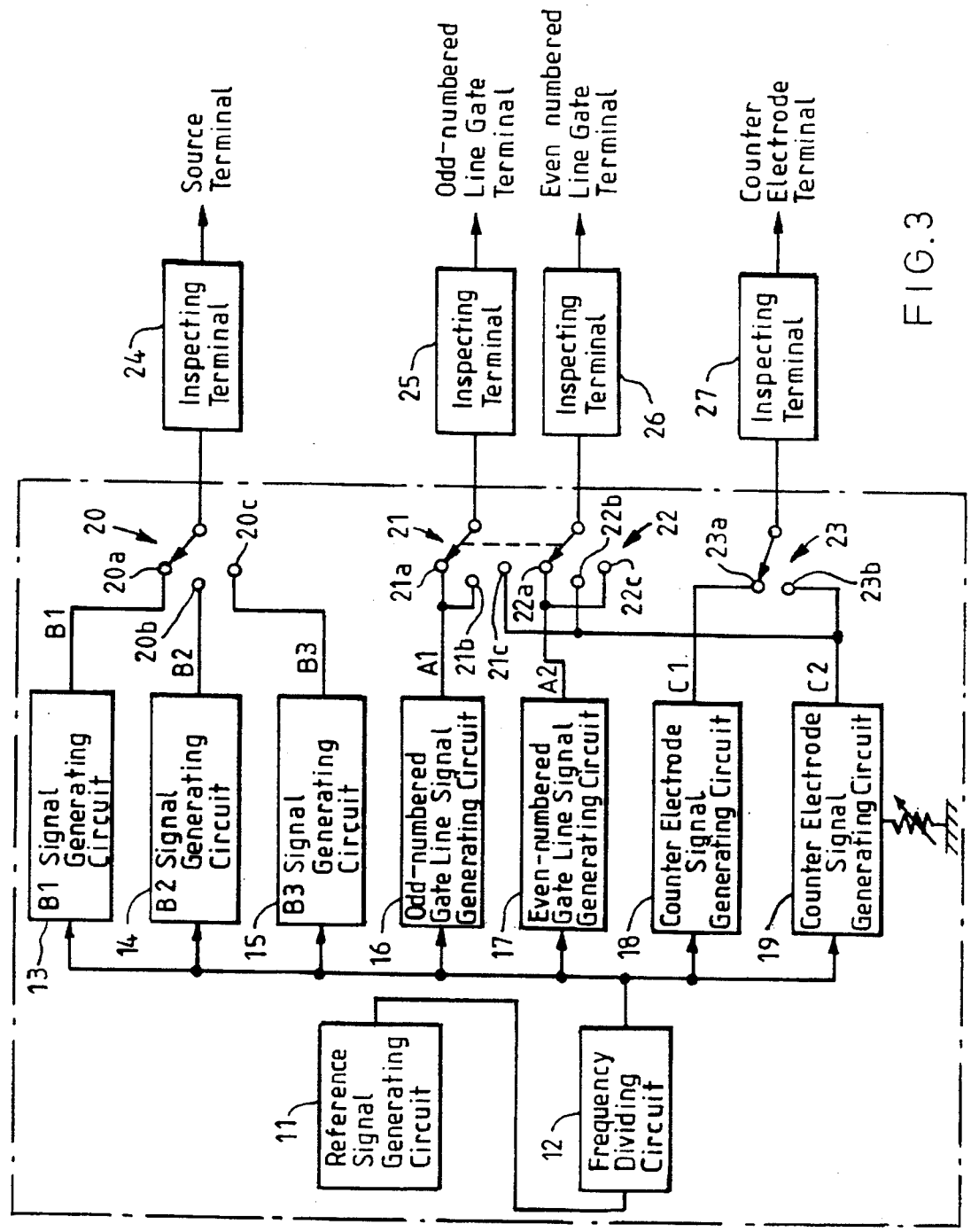
FIG. 3 is a block diagram showing an inspecting apparatus for an active matrix substrate according to the first example.

Next, an inspecting apparatus for an active matrix substrate according to the invention for detecting defects on an active matrix substrate having the above structure will be described. The inspecting apparatus includes a liquid crystal layer and a counter substrate adhering to the liquid crystal layer. On the counter substrate, counter electrodes 5 are previously formed. The inspecting apparatus is used in a state where the liquid crystal layer thereof is in contact with the active matrix substrate to be inspected. As is shown in FIG. 3, the inspecting apparatus further includes a reference signal generating circuit 11, a frequency dividing circuit 12 for dividing the frequency of an output signal from the reference signal generating circuit 11, seven signal generating circuits 13–19 to which an output signal from the frequency dividing circuit 12 is input, four switches 20–23, and four inspecting terminals 24–27.

Figure 4A:
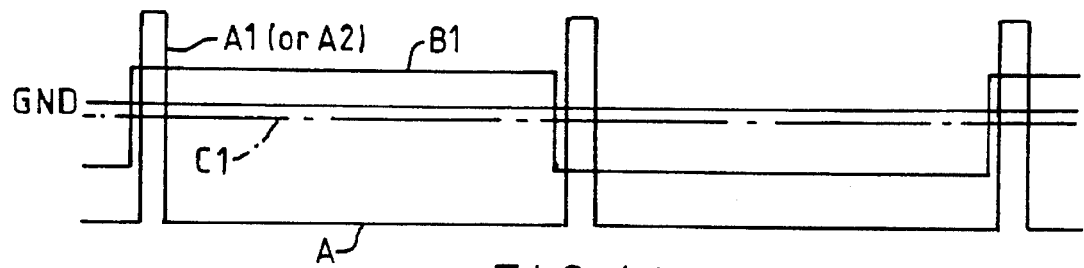
FIGS. 4A to 4C show waveforms of signals used in the inspecting method for an active matrix substrate according to the first example.
Figure 4B:
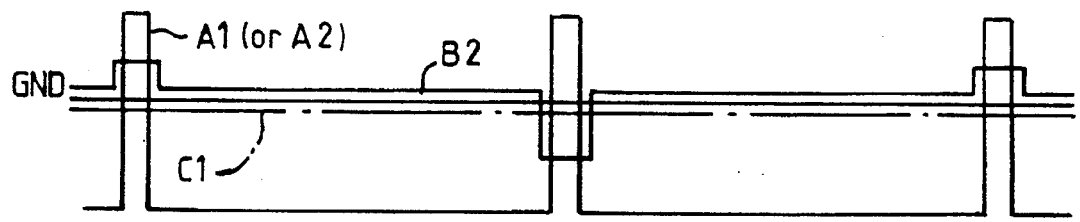
Figure 4C:
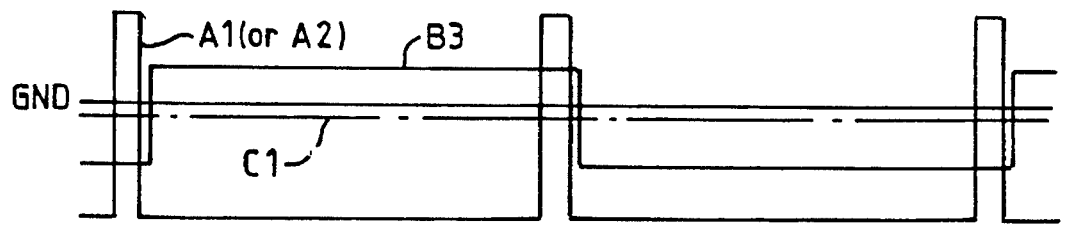

The B1 signal generating circuit 13, the B2 signal generating circuit 14, and the B3 signal generating circuit 15 generate the signals B1, B2, and B3 shown in FIGS. 4A to 4C, respectively, and the generated signals are supplied to the source bus lines 2. The odd-numbered gate line signal generating circuit 16 generates a signal A1 which is supplied to the odd-numbered gate bus lines 1. The even-numbered gate line signal generating circuit 17 generates a signal A2 which is supplied to the even-numbered gate bus lines 1. The signals A1 and A2 are supplied to the gate electrodes of the TFTs 3 connected to each gate bus line 1 for controlling the ON/OFF states of the TFTs 3. The waveform of the ON/OFF control signal A1 supplied to the odd-numbered gate bus lines 1 is the same as the waveform of the ON/OFF control signal A2 supplied to the even-numbered gate bus lines 1. However, the signals A1 and A2 are supplied to the corresponding gate bus lines 1 in such a manner that the timings thereof are slightly shifted from each other. This can be applied to FIGS. 6A to 6C, 9A to 9C, 11 and 15A to 15C which will be described later.

The counter electrode signal generating circuit 18 generates a signal C1 which is supplied to the counter electrode 5. The voltage level of the signal C1 is fixed to a counter voltage level which is adjusted to be an optimum level so that a display without flicker can be performed in an active matrix display apparatus including the active matrix substrate to be inspected. The counter electrode signal generating circuit 19 generates a signal which is not shown (hereinafter the signal is referred to as a signal C2), and the signal C2 is supplied to the counter electrodes 5. The voltage level of the signal C2 varies between the voltage for turning on the TFT 3 (hereinafter referred to as a gate-on voltage of the TFT 3) and the voltage for turning off the TFT 3 (hereinafter, referred to as a gate-off voltage of the TFT 3).

The voltage level of the signal B1 is maintained after it is written into each pixel by applying the signal A1 or A2 for writing the signal supplied to the source bus line 2 into each pixel to the TFT 3 until the signal A1 or A2 is supplied again for performing the writing in the next frame. The voltage level of the signal B2 changes after the signal A1 or A2 is applied to the TFT 3, to a voltage level which is different from the voltage level at the time when the signal A1 or A2 is applied, and the voltage level is maintained. Then, the voltage level of the signal B2 changes before the signal A1 or A2 for performing the writing in the next frame is applied again. The voltage level of the signal B3 changes after the signal A1 or A2 is applied to the TFT 3, to a voltage level which is different from the voltage level at the time when the signal A1 or A2 is applied, and the voltage level is maintained until the signal A1 or A2 for performing the writing in the next frame is applied again. When the signal A1 or A2 for the next frame is applied, the voltage level of the signal B3 change again to a different voltage level.

The signal B1 from the B1 signal generating circuit 13, the signal B2 from the B2 signal generating circuit 14, and the signal B3 from the B3 signal generating circuit 15 are output to three terminals 20a, 20b, and 20c of the switch 20, respectively. The switch 20 selects one of the terminals, 20a, 20b, or 20c, so as to supply one of the selected signal, B1, B2, or B3 to the inspecting terminal 24. The inspecting terminal 24 is in contact with the terminal 9a of the line 9 connected to the source bus lines 2.

The ON/OFF control signal A1 from the odd-numbered gate line signal generating circuit 16 is output to two terminals 21a and 21b, respectively, among three terminals 21a, 21b, and 21c of the switch 21. The signal C2 from the counter electrode signal generating circuit 19 is output to the remaining one terminal 21c of the switch 21. By selecting one of the terminals, 21a, 21b, or 21c, the switch 21 applies one of the signals, A1 or C2, to the inspecting terminal 25. The inspecting terminal 25 is in contact with the terminal 7a of the line 7 connected to the odd-numbered gate bus lines 1. The ON/OFF control signal A2 from the even-numbered gate line signal generating circuit 17 is output to two terminals 22a and 22c, respectively, among three terminals 22a, 22b, and 22c of the switch 22. The signal C2 from the counter electrode signal generating circuit 19 is output to the remaining one terminal 22b. The switch 22 selects one of the three terminals, 22a, 22b, or 22c, so as to apply one of the signals, A2 or C2, to the inspecting terminal 26. The inspecting terminal 26 is in contact with the terminal 8a of the line 8 connected to the even-numbered gate bus lines 1.

To two terminals 23a and 23b of the switch 23, the signal C1 from the counter electrode signal generating circuit 18 and the signal C2 from the counter electrode signal generating circuit 19 are output, respectively. The switch 23 selects one of the two terminals, 23a or 23b, so as to apply one of the signals, C1 or C2, to the inspecting terminal 27. The inspecting terminal 27 is in contact with a terminal (not shown) for the counter electrodes 5. The control of the switches 20–23 is performed by a control circuit (not shown), and the switches 21 and 22 are cooperatively operated.

Next, an inspecting method for an active matrix substrate shown in FIG. 1 by using the above-mentioned inspecting apparatus will be described. First, the liquid crystal layer of the inspecting apparatus comes in contact with the active matrix substrate to be inspected. In this step, the inspecting terminal 24 is in contact with the terminal 9a for the source bus lines 2, the inspecting terminal 25 is in contact with the terminal 7a for the odd-numbered gate bus lines 1, the inspecting terminal 26 is in contact with the terminal 8a for the even-numbered gate bus lines 1, and the inspecting terminal 27 is in contact with the terminal (not show:n) for the counter electrodes 5. Thereafter, by switching the switches 20–23, signals applied to the terminal 9a for the source bus lines 2, the terminals 7a and 8a for the gate bus lines 1 and the terminal for the counter electrodes 5 are selected. In this example, as is shown in Table 1, 6 types of signal combinations are used as inspecting signals (Nos. 1–6).

TABLE 1

| | Cs-On-Gate Structure | | | | | |
|---|---|---|---|---|---|---|
| | Source signal is changed at optimum Counter voltage | | | Counter electrode voltage can be varied | | Gate on auxiliary capacitance side is connected to counter electrode, voltage can be varied between Gate-off voltage and Gate-on voltage |
| | B1 | B2 | B3 | Gate-off voltage | Gate-on voltage | |
| TFT OFF-failure | ● | ○ | ○ | ● | ● | ● |
| Leakage between source and pixel electrode | ● | ○ | ● | ● | ● | ● |
| Leakage between electrodes of auxiliary capacitance | ● | ● | ● | ○ | ● | ○ |
| Leakage between gate and drain | ● | ● | ● | ○ | ● | OFF-voltage ○   ON-voltage ● |
| Leakage between upper and lower pixel electrodes | ○ | ○ | ○ | ○ | ○ | ○ |
| SW20 | 20a | 20b | 20c | 20a | 20a | 20a |
| SW21, 22 | 21a, 22a | 21a, 22a | 21a, 22a | 21a, 22a | 21a, 22a | 21b, 22b or 21c, 22c |
| SW23 | 23a | 23a | 23a | 23b | 23b | 23b |
| Inspecting signals (No.) | 1 | 2 | 3 | 4 | 5 | 6 |

●: Black spot    ○: Luminous spot

As is seen from Table 1, in the case of the inspecting signal No. 1, the terminal 20a is selected by the switch 20, the terminals 21a and 22a are selected by the switches 21 and 22, and the terminal 23a is selected by the switch 23. In other words, the inspecting signal No. 1 is a signal combination of A1 (or A2), B1, and C1. In the case where the terminal 20b is selected by the switch 20, the terminals 21a and 22a are selected by the switches 21 and 22, and the terminal 23a is selected by the switch 23, the inspecting signal No. 2 is obtained which is a signal combination of A1 (or A2), B2, and C1. The inspecting signal No. 3 is a signal combination of A1 (or A2), B3, and C1, in the case where the terminal 20c is selected by the switch 20, the terminals 21a and 22a are selected by the switches 21 and 22, and the terminal 23a is selected by the switch 23. As is apparent from the above description, in the inspecting signal Nos. 1–3, only the signal applied to the source bus lines 2 is different, but the signals applied to the gate bus lines 1 and the counter electrodes 5 are the same.

When the inspecting signal No. 4 is to be used, the switch 20 selects the terminal 20a, and the switches 21 and 22 select the terminals 21a and 22a. The switch 23 selects the terminal 23b, so that the signal C2 is output to the terminals for the counter electrodes 5. In this case, the voltage of the signal C2 corresponds to the gate-off voltage of the TFTs 3. When the inspecting signal No. 5 is to be used, the switch 20 selects the terminal 20a, the switches 21 and 22 select the terminals 21a and 22a and the switch 23 selects the terminal 23b. In this case, the voltage of the signal C2 corresponds to the gate-on voltage of the TFTs 3. In other words, in these inspecting signals Nos. 4 and 5, the signals applied to the gate bus lines 1 and the source bus lines 2 are the same, but the voltage of the signal C2 applied to the counter electrodes 5 is different.

Moreover, the switch 20 selects the terminal 20a, the switch 21 selects the terminal 21b or 21c, the switch 22 selects the terminal 22b or 22c, and the switch 23 selects the terminal 23b, so that the inspecting signal No. 6 is selected. That is, the inspecting signal No. 6 is a signal combination of A1 (or A2), B2 (or B3), and C2. In this case, the voltage level of the signal C2 is variable between the gate-off voltage of the TFTs 3 and the gate-on voltage of the TFTs 3.

The inspecting apparatus of this example uses the above-mentioned six types of inspecting signals Nos. 1–6 for inspecting the active matrix substrate. In this example, an exemplary case where the display mode is a normally white mode is described.

(A defect due to OFF failure)

Figure 5A:
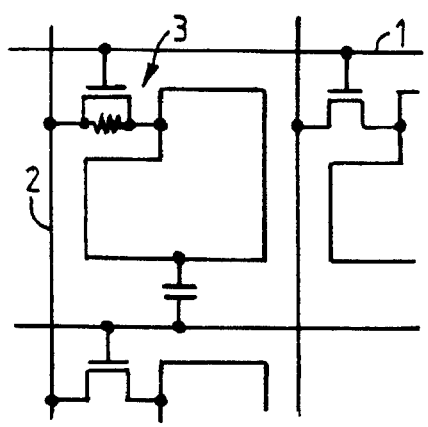
FIG. 5A is a schematic diagram showing a defect due to OFF failure on the active matrix substrate having a Cs-On-Gate structure.
Figure 6A:
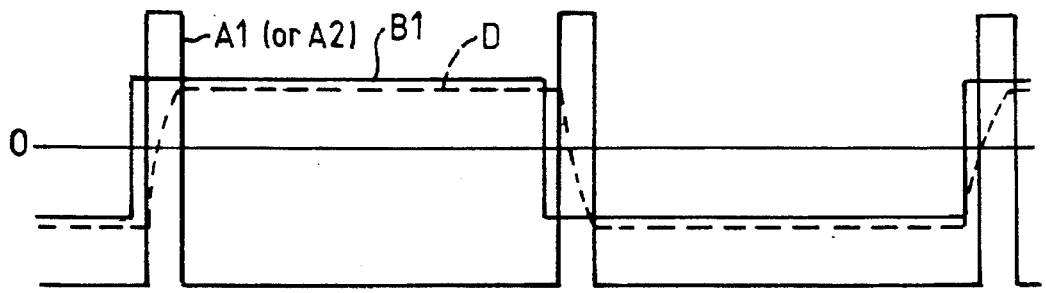
FIGS. 6A to 6C each show a waveform indicating a potential at a drain electrode of a TFT in the case of a defect due to OFF failure.
Figure 6B:
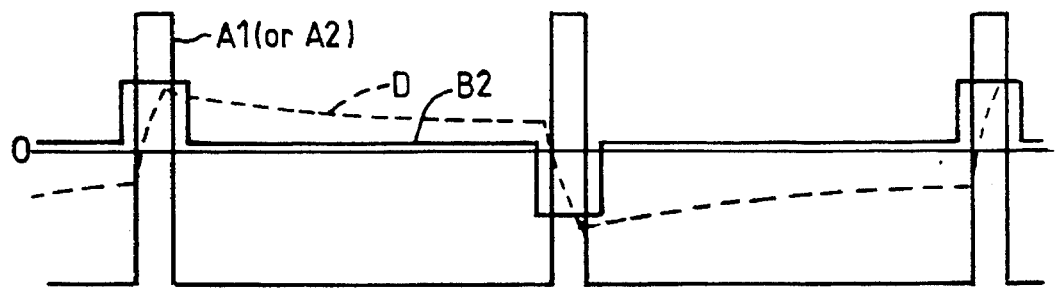
Figure 6C:
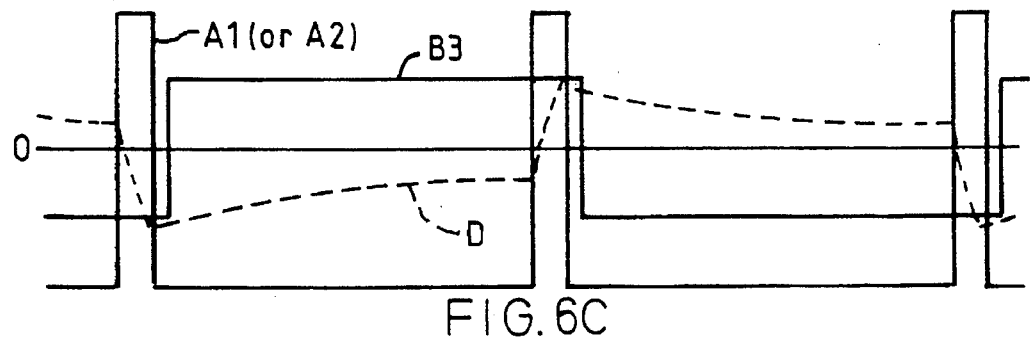
Figure 7:
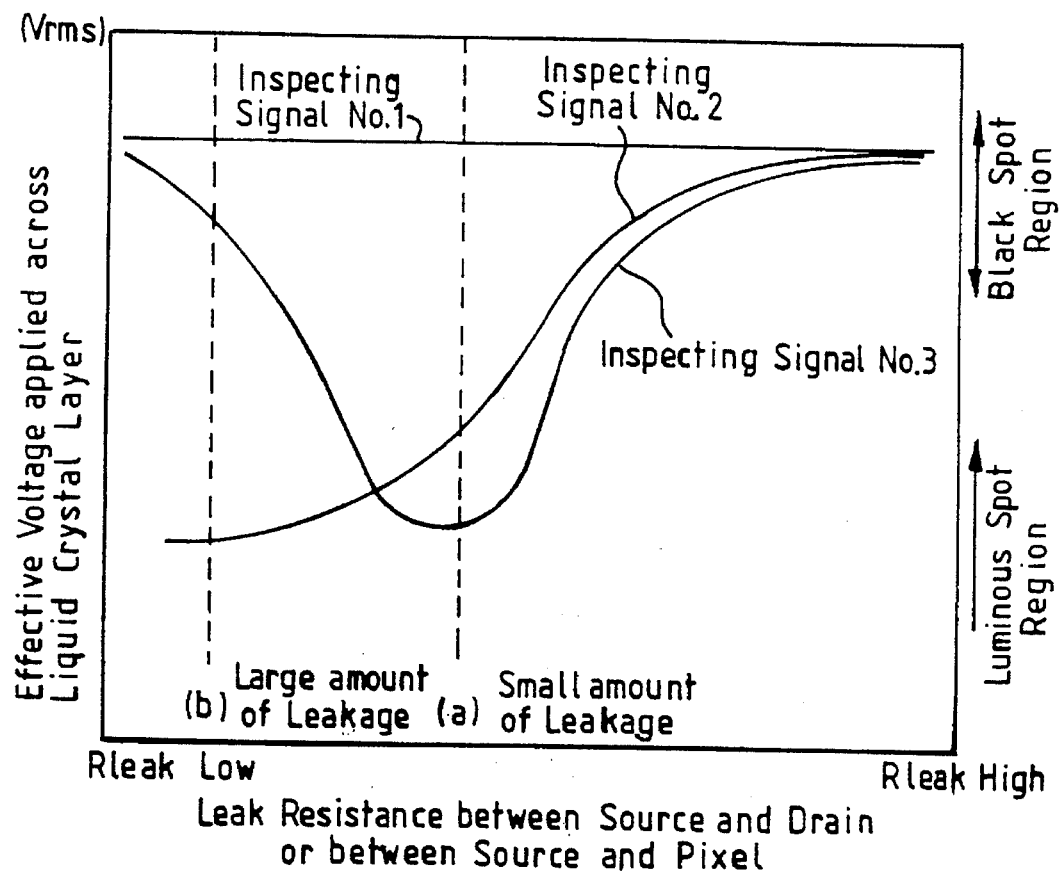
FIG. 7 shows a relationship between an effective voltage applied to a liquid crystal layer and a leakage resistance between a source and a drain of a TFT or between a source bus line and a pixel electrode.

First, the detection of a defect due to OFF failure is described. The defect due to OFF failure is caused by a small amount of leakage between the source electrode and the drain electrode of a TFT 3, as is shown in FIG. 5A. In order to detect such a defect due to OFF failure, the inspecting signals Nos. 1–3 are used, as is shown in FIGS. 6A–6C. As described above, when the inspecting signals Nos. 1–3 are selected, the signal A1 or A2 is applied to the gate bus lines 1, and the signal C1 which is fixed to the optimum counter voltage is applied to the counter electrodes 5. To the source bus lines 2, the signal B1 is applied in the case of the inspecting signal No. 1, the signal B2 is applied in the case of the inspecting signal No. 2, and the signal B3 is applied in the case of the inspecting signal No. 3. When the signals of such a combination are applied under the condition that the counter voltage is adjusted to be optimum, in a defective pixel portion where the OFF characteristics of a TFT 3 are poor, an effective voltage for displaying a black spot is applied to the liquid crystal layer for the inspecting signal No. 1, and an effective voltage for displaying a luminous spot is applied to the liquid crystal layer for the inspecting signals Nos. 2 and 3, as is shown in FIG. 7. Therefore, the black spot is displayed for the inspecting signal No. 1, and the luminous spot is displayed for the inspecting signals Nos. 2 and 3. As is seen from Table 1, for the inspecting signals Nos. 1–3, the display pattern in the case of the defect due to OFF failure is different from display patterns in the cases of the other types of defects. Therefore, it is possible to identify the occurring defect as a defect due to OFF failure by monitoring the display pattern by eye when the inspecting signals Nos. 1–3 are applied.

Figure 5B:
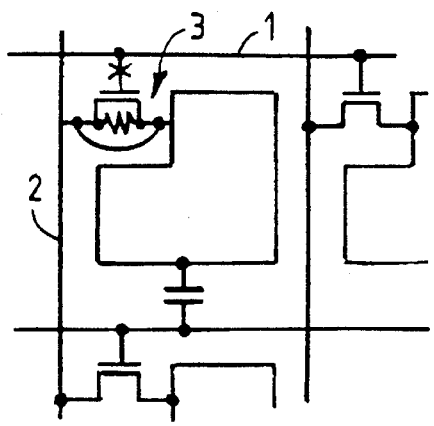
FIG. 5B is a schematic diagram showing the corrected portion.

When a defect due to OFF failure is detected, the correction is performed in the portion of the active matrix substrate where the defect occurs, as is shown in FIG. 5B. First, the gate electrode of the TFT 3 connected to the defective pixel is disconnected from the gate bus line 1. Then, the source electrode and the drain electrode of the TFT 3 are connected to each other. Thus, the correction is completed. The correction can be performed by using a laser beam or the like. In the corrections which will be described below, a laser beam or the like can be applied.

FIGS. 6A to 6C show waveforms D of the potential at the drain electrode of the TFT 3 for the inspecting signals Nos. 1–3, respectively. The waveforms are different from those in the cases of the other types of defects. Therefore, instead of monitoring by eye, it is possible to detect the defect due to OFF failure by electrically measuring the potential at the drain electrode of the TFT 3.

(A defect due to leakage between a pixel electrode and a source bus line)

Figure 8:
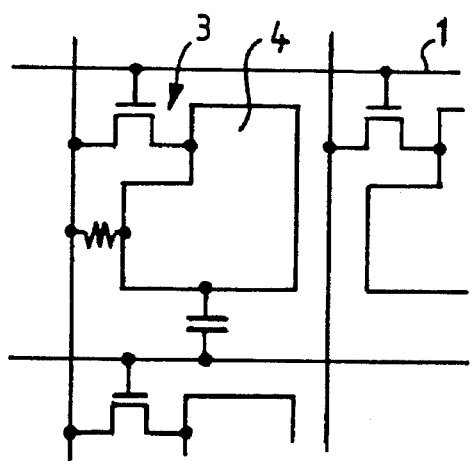
FIG. 8 is a schematic; diagram showing a defect due to leakage between the pixel electrode and the source bus line on the active matrix substrate having a Cs-On-Gate structure.

This type of defect is caused by a large amount of leakage between a pixel electrode 4 and a source bus line 2, as is shown in FIG. 8. In this case, the same as in the detection of the defect due to OFF failure, the inspecting signals Nos. 1–3 are used. When the inspecting signals Nos. 1–3 are applied under a condition that the counter voltage is adjusted to be optimum, in a portion where a large amount of leakage occurs, an effective voltage for displaying a black spot is applied to the liquid crystal layer for the inspecting signals Nos. 1 and 3, and an effective voltage for displaying a luminous spot is applied to the liquid crystal layer for the inspecting signal No. 2, as is shown in FIG. 7. Therefore, the black spot is displayed for the inspecting signals Nos. 1 and 3, and the luminous spot is displayed for the inspecting signal No. 2. As is seen from Table 1, for the inspecting signals Nos. 1–3, the display pattern in the case of the defect due to leakage between the pixel electrode 4 and the source bus line 2 is different from display patterns in the cases of the other types of defects. Therefore, it is possible to identify the occurring defect as a defect due to leakage between the pixel electrode 4 and the source bus line 2 by monitoring the display pattern by eye.

Figure 9A:
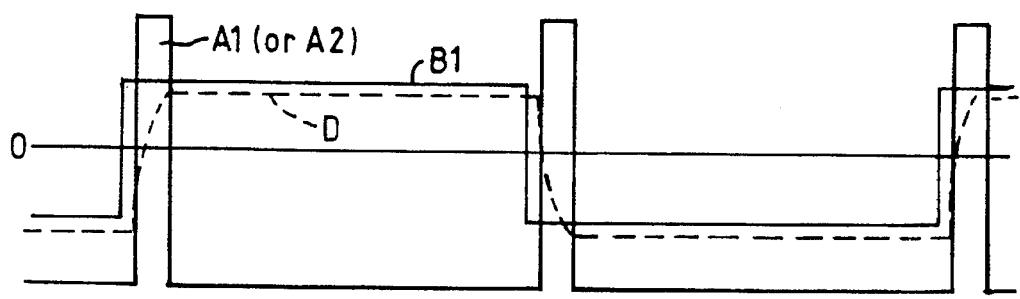
FIGS. 9A to 9C each show a waveform indicating a potential at a drain electrode of a TFT in the case of a defect due to leakage between the pixel electrode and the source bus line.
Figure 9B:
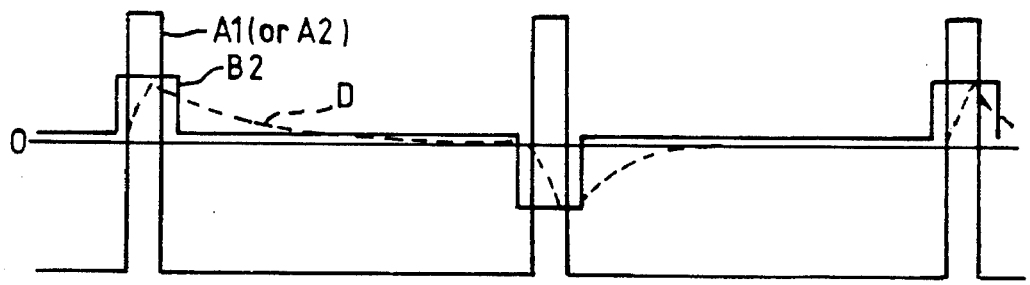
Figure 9C:
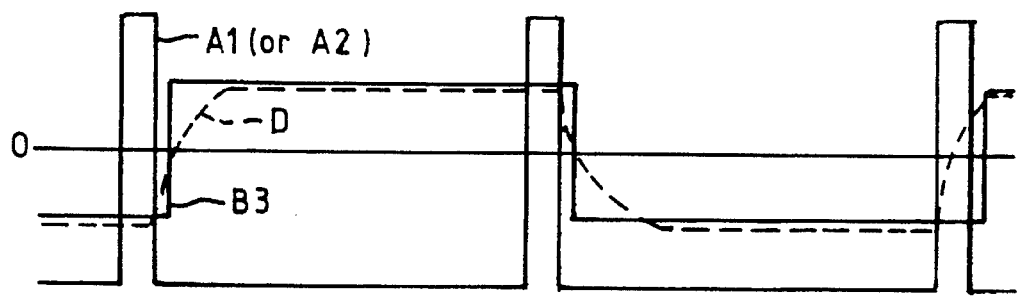

FIGS. 9A to 9C show the waveforms D of the potential at the drain electrode of the TFT 3 for the inspecting signals Nos. 1–3, respectively. The waveforms D are different from those in the cases of the other types of defects. Therefore, instead of monitoring by eye, it is possible to detect the defect due to leakage between the pixel electrode 4 and the source bus line 2 by electrically measuring the potential at the drain electrode of the TFT 3.

In this case, even if the active matrix substrate to be inspected is actually assembled to be an active matrix display apparatus, and the active matrix display apparatus is actually driven, the pixel in the portion where the above leakage occurs cannot be observed as a defect. Accordingly, this type of defect is not corrected.

(A pixel defect due to leakage between electrodes of an auxiliary capacitance)

Figure 10A:
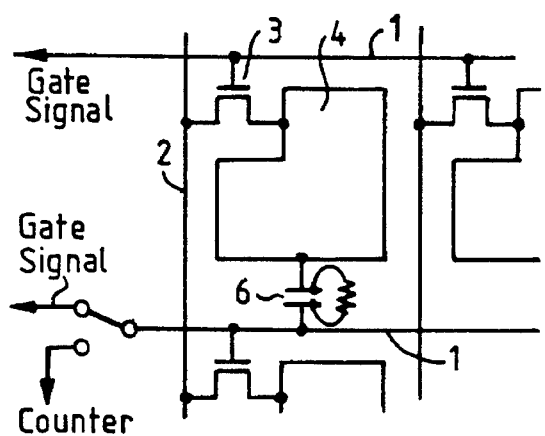
FIG. 10A is a schematic diagram showing a pixel defect due to leakage between electrodes of an auxiliary capacitance on the active matrix substrate having a Cs-On-Gate structure.

This type of defect is caused by a leakage between one electrode of an auxiliary capacitance 6 provided in parallel with a pixel capacitance and the other electrode of the auxiliary capacitance 6 connected to the adjoining gate bus line 1, as is shown in FIG. 10A. In this case, unlike the above two cases, the inspecting signals Nos. 1–3 cannot be used for the inspection, but the inspecting signals Nos. 4 and 6 are used. When the inspecting signal No. 4 is applied, the gate-off voltage of the TFT 3 is applied to the counter electrode 5. If there occurs a leakage between the electrodes constituting the auxiliary capacitance 6, a luminous spot is displayed. When the inspecting signal No. 6 is selected, the gate bus line 1 to which the electrode of the auxiliary capacitance 6 is connected to the counter electrode 5, and the voltage which is supplied to the counter electrode 5 is changed from the gate-off voltage of the TFT 3 to the gate-on voltage of the TFT 3, a luminous spot is displayed for every voltage. As is seen from Table 1, for the inspecting signals Nos. 4 and 6, the display pattern is different from display patterns in the cases of the other types of defects. Therefore, it is possible to identify the occurring defect as a defect due to leakage between electrodes of the auxiliary capacitance by monitoring the display pattern by eye when the inspecting signals No. 4 and 6 are applied.

Figure 10B:
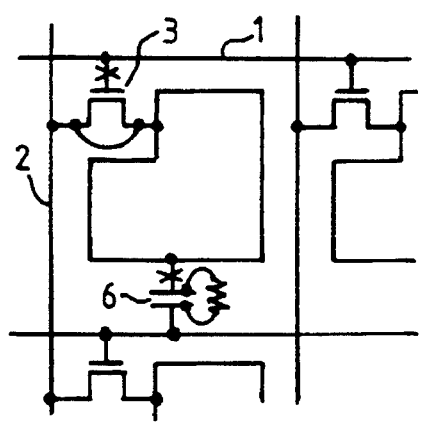
FIG. 10B is a schematic diagram showing the corrected portion.

The defect due to leakage between the electrodes of an auxiliary capacitance is corrected in the following manner, as is shown in FIG. 10B. First, in the portion of the defective pixel due to leakage, the TFT 3 is disconnected from the gate bus line 1. Then, the source electrode and the drain electrode of the TFT 3 are connected to each other. In addition, the electrode of the auxiliary capacitance is disconnected from the gate bus line 1.

Figure 11:
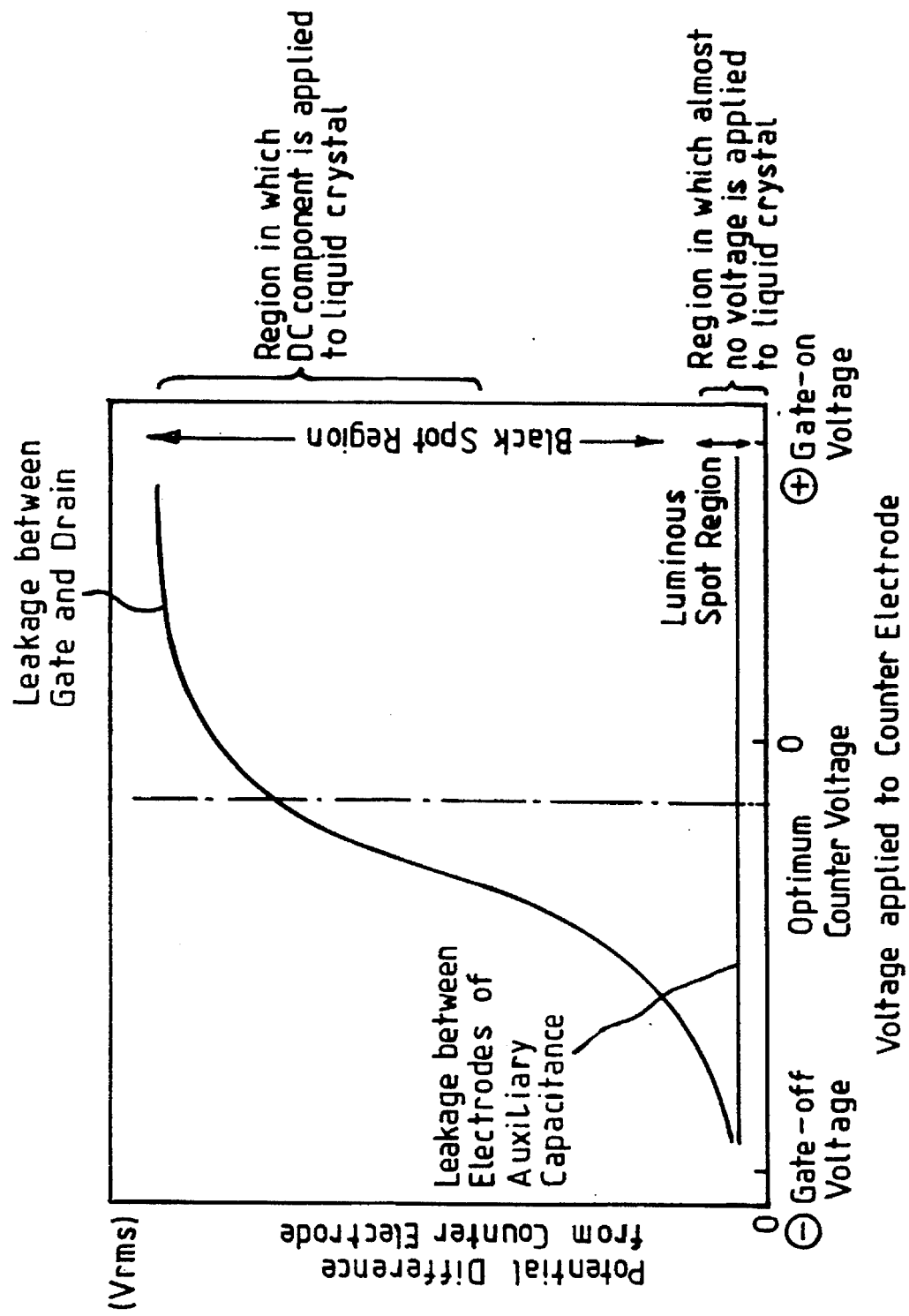
FIG. 11 shows a waveform indicating a potential difference from the counter electrode for the inspecting signal No. 6 in the case of a defect due to leakage between electrodes of the auxiliary capacitance.

As is seen from FIG. 11, the potential difference from the counter electrode for the inspecting signal No. 6 is different from that in the case of the other defect type. Therefore, instead of monitoring by eye, it is possible to detect the defect of this type by electrically measuring the potential difference from the counter electrode.

Figure 12:
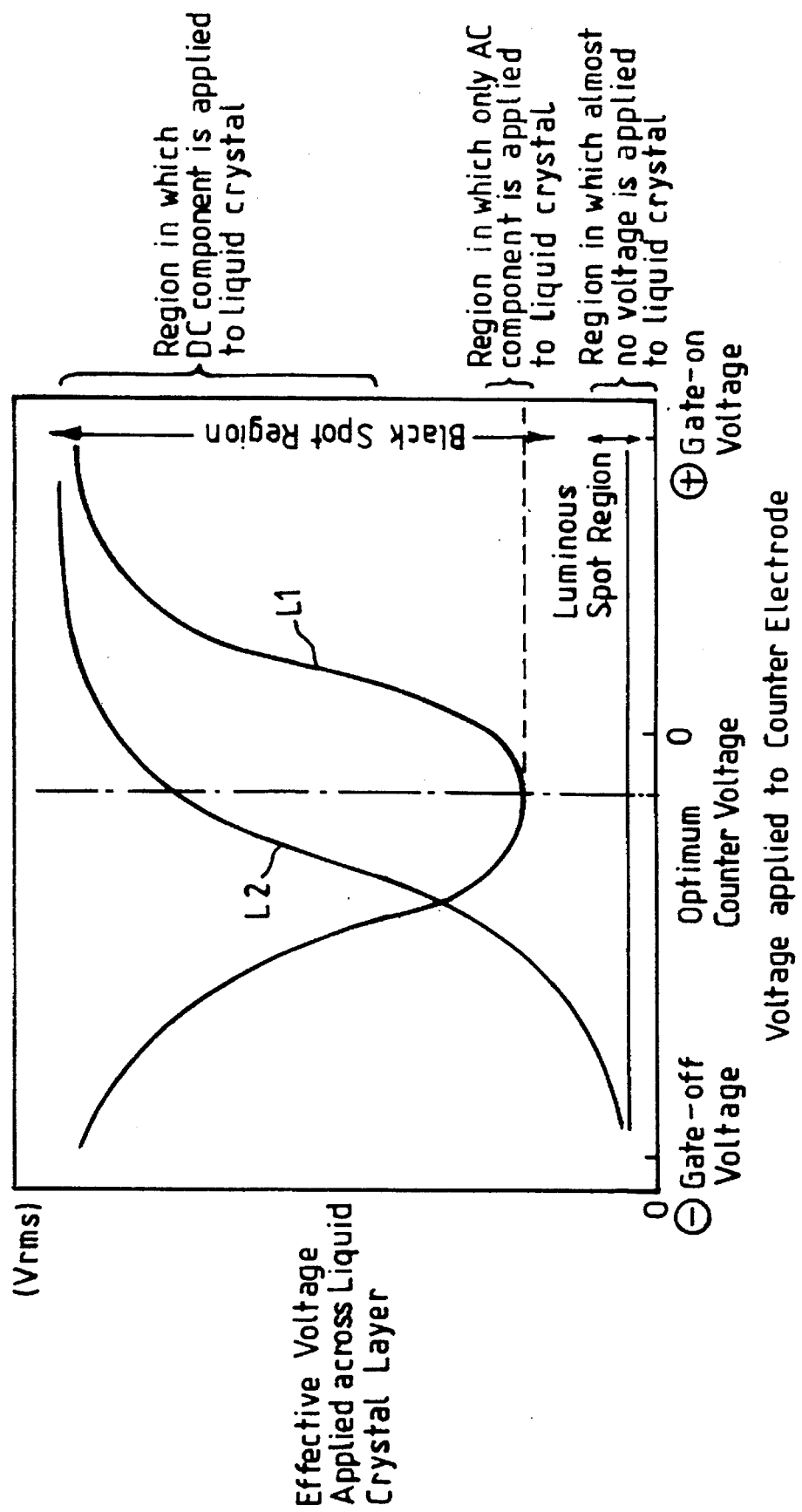
FIG. 12 is a graph showing a relationship between a voltage applied to a counter electrode and an effective voltage applied to the liquid crystal layer.

As a reference, FIG. 12 shows a variation in an effective voltage applied to the liquid crystal layer as the voltage applied to the counter electrode is varied. It is found that, for a normal pixel shown by a curve L1, a voltage for displaying a black spot is applied to the liquid crystal layer while various inspecting signals are applied. On the other hand, for a defective pixel shown by a curve L2, the voltage for displaying a black spot as well as the voltage for displaying a luminous spot may by applied to the liquid crystal layer while various inspecting signals are applied. Accordingly, the pixel defect due to leakage between the electrodes of the auxiliary capacitance is detected based on the above curve L2. A pixel defect due to leakage between the gate electrode and the drain electrode of the TFT 3 can be detected in the same manner.

(A pixel defect due to leakage between a counter electrode and a pixel electrode)

This type of defect is caused by a condition that the counter electrode 5 and the pixel electrode 4 are electrically connected to each other. In this case, as is seen from Table 1, the display is always a luminous spot for all the inspecting signals Nos. 1–6. This display pattern is different from display patterns in the cases of the other types of defects. Therefore, it is possible to detect a pixel defect due to leakage between the counter electrode 5 and the pixel electrode 4. Such a pixel defect caused by a foreign material between the electrodes can be corrected by finding out the defective portion by monitoring by eye, and then by performing repair work depending on the defective condition.

(A defect due to leakage between the gate electrode and the drain electrode of a TFT)

This type of defect is caused by a leakage between the gate electrode and the drain electrode of a TFT 3 for driving a pixel, as is shown in FIG. 13A. In this case, the inspecting signals Nos. 1–3 cannot be used for the inspection, but the inspecting signals Nos. 4 and 6 are used. When the inspecting signal No. 4 is applied and the gate-off voltage of the TFT 3 is applied to the counter electrode 5, a luminous spot is displayed. When the inspecting signal No. 6 is selected, the gate bus line 1 to which the electrode of the auxiliary capacitance 6 is connected to the counter electrode 5, and the voltage which is applied to the counter electrode 5 is changed from the gate-off voltage of the TFT 3 to the gate-on voltage of the TFT 3. Unlike the above pixel defect due to leakage between the electrodes of an auxiliary capacitance, only when the voltage of the counter electrode 5 is the gate-off voltage of the TFT 3, a luminous spot is displayed. As is seen from Table 1, the display pattern is different from display patterns in the cases of the other types of defects. Therefore, it is possible to identify the occurring defect as a defect due to leakage between the gate electrode and the drain electrode of the TFT 3 by monitoring the display pattern by eye.

The defect due to leakage between the gate electrode and the drain electrode of the TFT 3 is corrected in the following manner, as is shown in FIG. 13B. First, the gate electrode of the TFT 3 at which the leakage occurs is disconnected from the gate bus line 1, and the source electrode and the drain electrode of the TFT 3 are connected to each other.

As is seen from FIG. 11, the potential difference from the counter electrode for the inspecting signal No. 6 is different from that in the case of the other defect type. Therefore, instead of the monitoring by eye, it is possible to detect the defect of this type by electrically measuring the potential difference from the counter electrode.

(A line defect due to leakage between a gate bus line and a source bus line)

This type of defect is caused by a leakage between the gate bus line 1 and the source bus line 2, as is shown in FIG. 14A. The line defect is observed on a display as a cross because display failure occurs in the pixel electrodes in a row connected to the gate bus line 1 where the leakage occurs and in the pixel electrodes in a column connected to the source bus line 2 where the leakage occurs.

When such a defect occurs, the difference between the gate-off voltage of the TFT 3 and the gate-on voltage of the TFT 3 is made smaller because of the influence by the signal supplied to the source bus line 2 as compared with a case where no defect occurs. Accordingly, a desired value for an on resistance and a desired value for an off resistance of the TFT 3 cannot be maintained. Therefore, the TFT 3 which is connected to the source bus line 2 and the gate bus line 1 between which a leakage occurs operates apparently the same as the TFT 3 having OFF failure. For detecting such a defect, the inspecting signals Nos. 1 and 3 are used. The line in the horizontal direction based on the pixel electrodes connected to the gate bus line 1, the line appearing as a line defect, is more clearly observed in the case of the application of the inspecting signal No. 3, as compared with the case of the application of the inspecting signal No. 1. At this time, the line in the vertical direction based on the pixel electrodes connected to the source bus line 2 is also clearly observed. Therefore, the defective portion can be specified on the basis of the crossing lines which clearly appear. The correction for such a defect is performed in the following manner, as is shown in FIG. 14B. Both sides of the portion of the source bus line 2 where the leakage occurs are cut, and the signal is applied to both the ends of the corresponding source bus line 2.

Figure 15A:
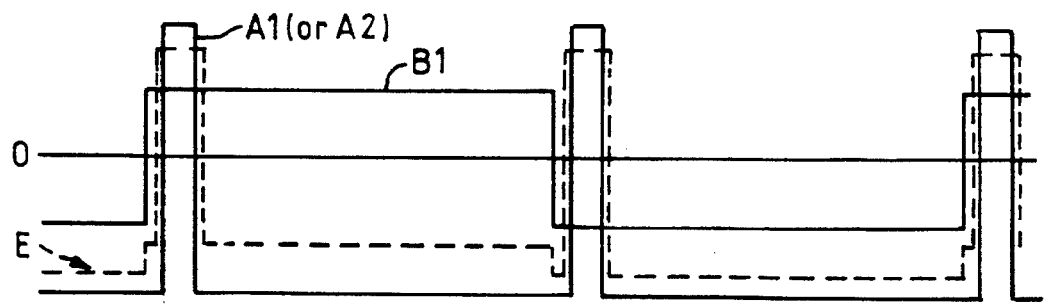
FIGS. 15A to 15C each show a waveform of a gate signal in the case of a line defect due to leakage between the gate bus line and the source bus line.
Figure 15B:
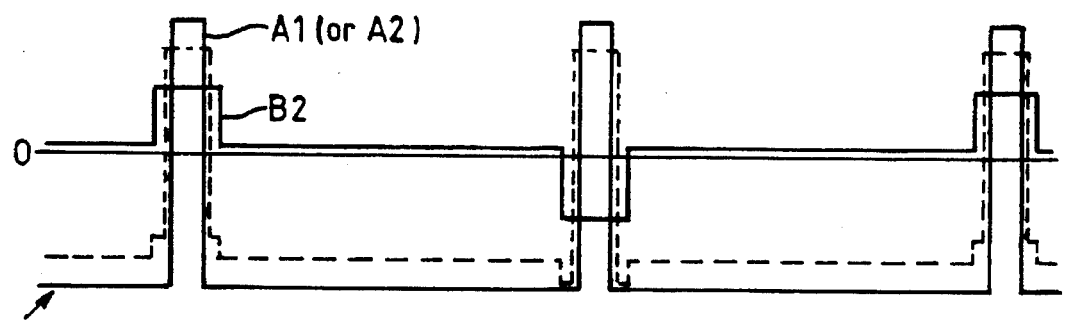
Figure 15C:
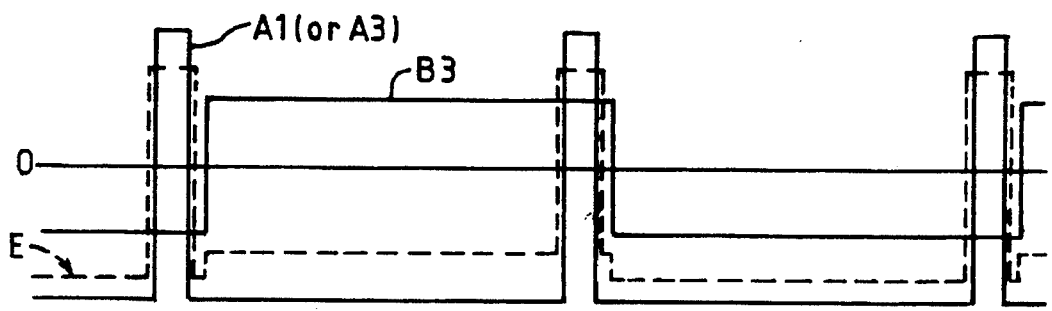

In a case where the leakage occurs between the gate bus line 1 and the source bus line 2, the waveforms E of the signal applied to the gate electrode of the TFT 3 are as shown in FIGS. 15A to 15C, respectively, which are different from the waveforms E in the cases of the other types of defects. Accordingly, it is possible to detect the defect by electrically measuring the potential, instead of monitoring by eye.

Example 2

Figure 16:
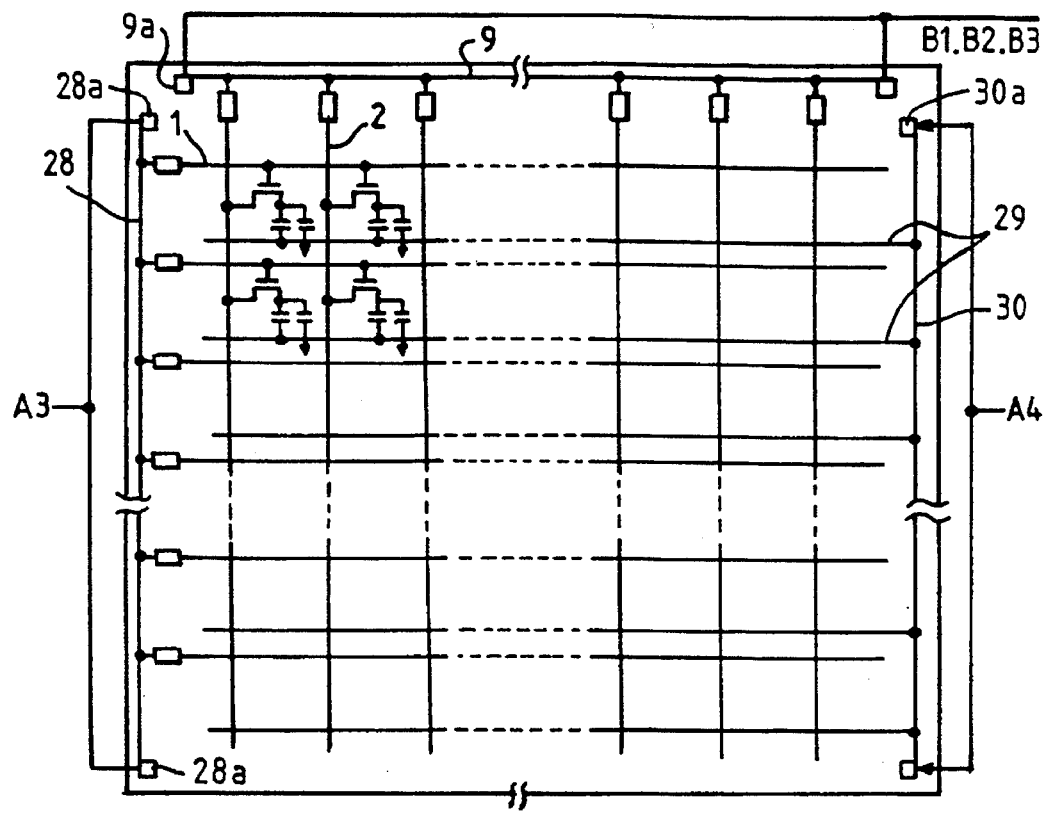
FIG. 16 is a plan view showing an entire active matrix substrate having a Cs-On-Common structure to which an inspecting method of an active matrix substrate according to the second example of the invention.
Figure 17:
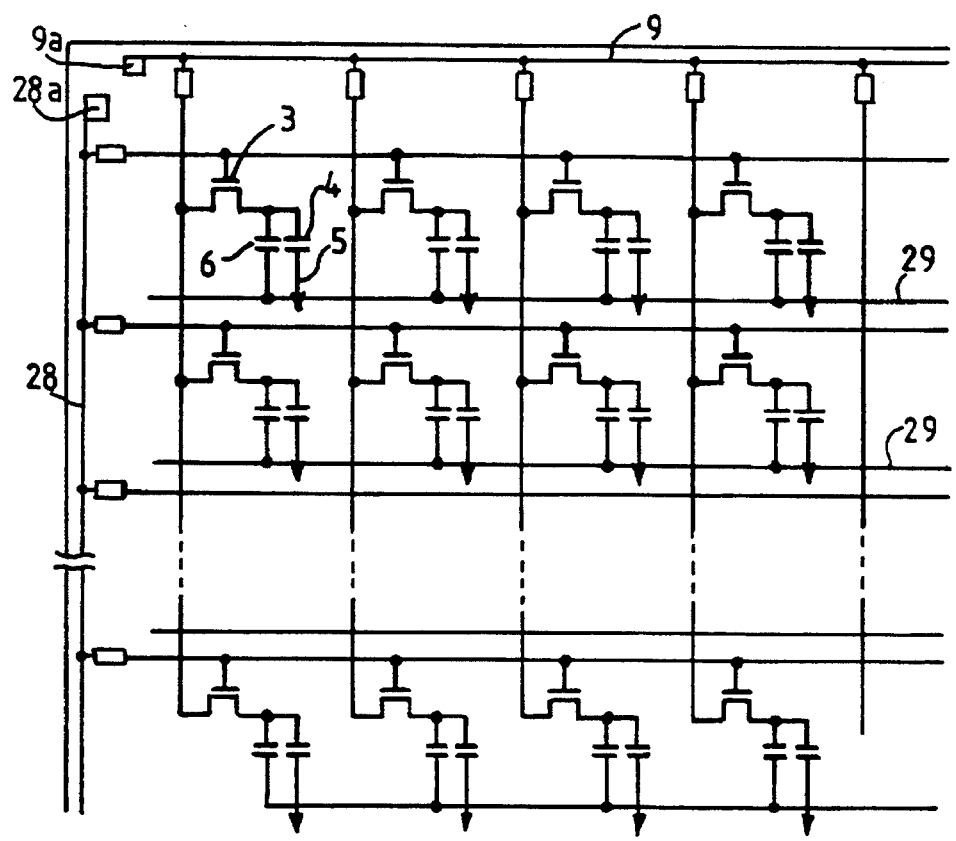
FIG. 17 is a plan view showing part of the active matrix substrate of FIG. 16.

FIG. 16 shows the construction of an entire active matrix substrate utilizing TFTs as switching elements. FIG. 17 shows part of the active matrix substrate. On an insulating substrate of the active matrix substrate, a plurality of gate bus lines 1 as scanning lines are disposed in parallel. A plurality of source bus lines 2 as signal lines are disposed in parallel so as to cross the gate bus lines 1. In the vicinity of each of the crossings of the gate bus lines 1 and the source bus lines 2, a TFT 3 is disposed. The gate electrode of each TFT 3 is connected to the gate bus line 1. The drain electrode of each TFT 3 is connected to a pixel electrode 4. The pixel electrodes 4 are disposed in a matrix on the insulating substrate, and the gate bus lines 1 and the source bus lines 2 are provided along the periphery of the pixel electrodes 4. An auxiliary capacitance ($C_S$) 6 is provided between the drain electrode of the TFT 3 and an auxiliary capacitance common line 29 provided in parallel with a gate bus line 1 to which the gate electrode of the TFT 3 is connected. That is, the active matrix substrate has a so-called Cs-On-Common structure.

The gate bus lines 1 are connected to each other via line 28. The line 28 is provided with terminals 28a on both the ends thereof. Also, the auxiliary capacitance common lines 29 are connected to each other via line 30. The line 30 is provided with terminals 30a for the auxiliary capacitances 6. One end of each of the source bus lines 2 is connected to line 9. The line 9 is provided with terminals 9a on both the ends thereof.

When a counter substrate on which a liquid crystal layer and counter electrodes are previously formed is disposed so that the liquid crystal layer is adjacent to an active matrix substrate having the above-mentioned structure, a pixel capacitance ($C_{LC}$) is generated between a counter electrode 5 which is previously formed on a side of the counter substrate adjacent to the liquid crystal layer and the corresponding pixel electrode 4 on the active matrix substrate.

Figure 18:
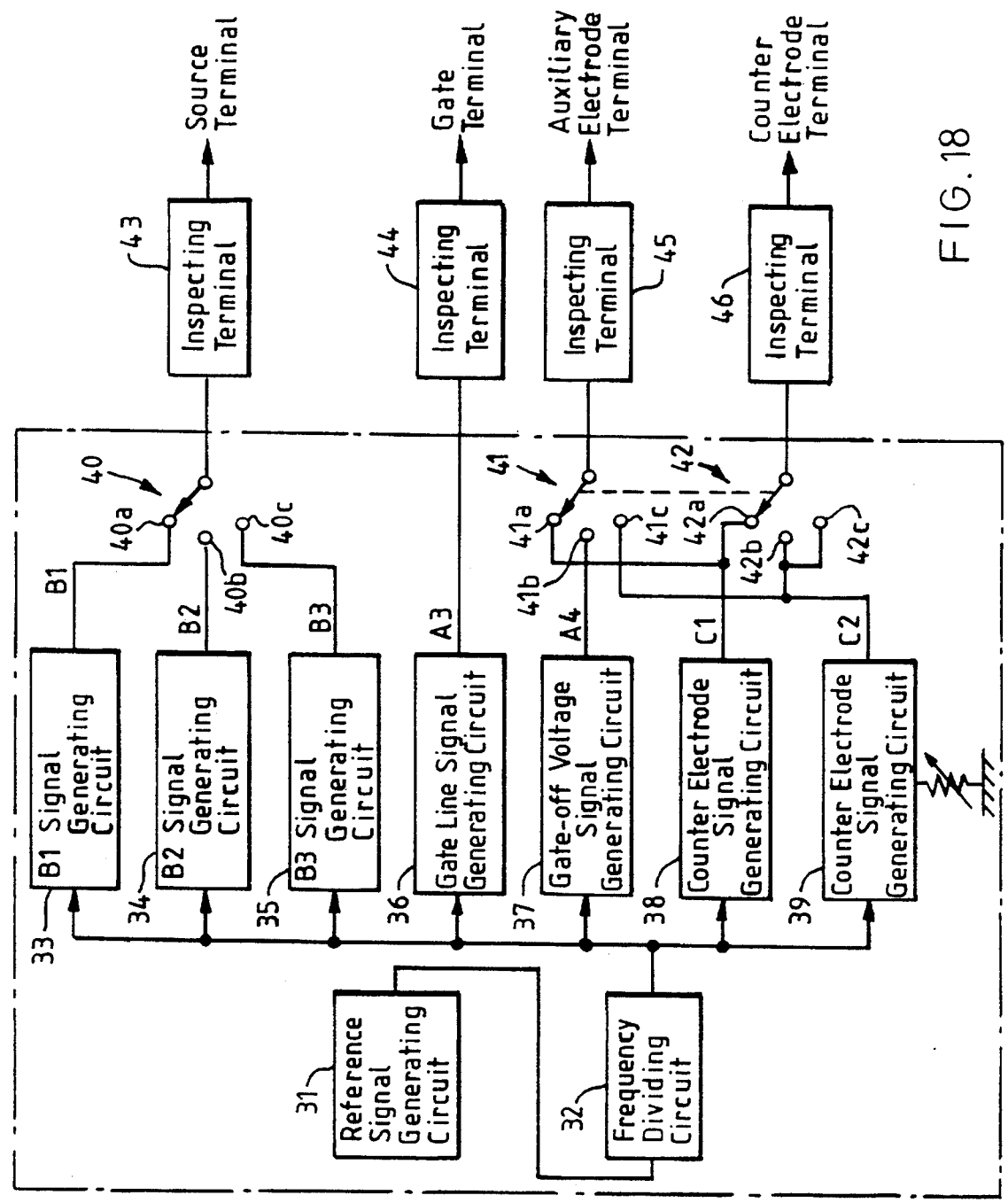
FIG. 18 is a block diagram showing an inspecting apparatus for an active matrix substrate according to the second example.

Next, an inspecting apparatus for an active matrix substrate according to the invention for detecting defects on the active matrix substrate having the above structure will be described. The inspecting apparatus includes a liquid crystal Layer and a counter substrate adhering to the liquid crystal layer. On the counter substrate, counter electrodes 5 are previously formed. The inspecting apparatus is used in a state where the liquid crystal layer thereof is in contact with the active matrix substrate to be inspected. As is shown in FIG. 18, the inspecting apparatus further includes a reference signal generating circuit 31, a frequency dividing circuit 32 for dividing the frequency of an output signal from the reference signal generating circuit 31, seven signal generating circuits 33–39 to which an output signal from the frequency dividing circuit 32 is input, three switches 40–42, and four inspecting terminals 43–46.

Figure 19A:
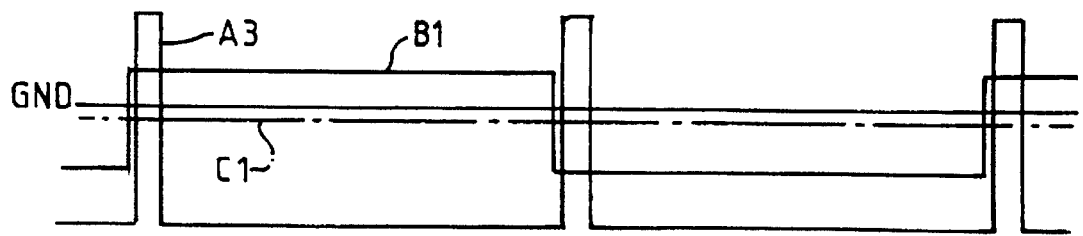
FIGS. 19A to 19C show waveforms of signals used in the inspecting method for an active matrix substrate according to the second example.
Figure 19B:
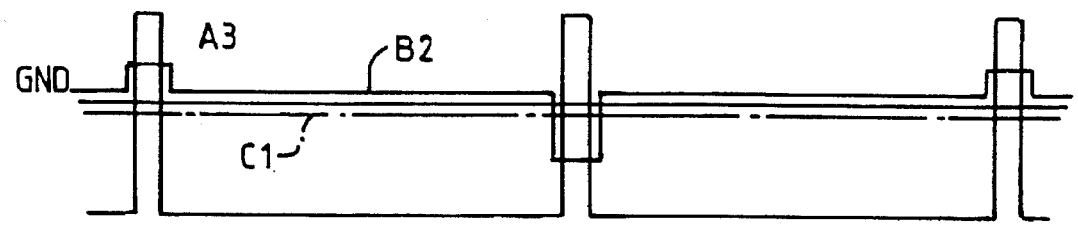
Figure 19C:
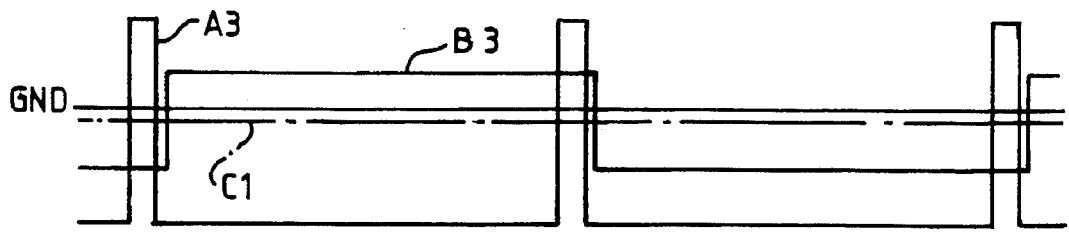

The B1 signal generating circuit 33, the B2 signal generating circuit 34, and the B3 signal generating circuit 35 generate the signals B1, B2, and B3 shown in FIGS. 19A to 19C, respectively, and the generated signals are supplied to the source bus lines 2. The gate line signal generating circuit 36 generates a signal A3 which is supplied to the gate bus lines 1. The signal A3 is supplied to the gate electrodes of the TFTs 3 connected to each gate bus line 1 for controlling the ON/OFF states of the TFTs 3. The gate-off voltage signal generating circuit 37 generates an OFF control signal A4 (not shown) for the gate bus line 1. By the selection of the switch 41, the OFF control signal A4 is supplied to the auxiliary capacitance common lines 29. The counter electrode signal generating circuit 38 generates a signal C1 which is supplied to the counter electrode 5. The voltage level of the signal C1 is fixed to a counter voltage level which is adjusted to be an optimum level so that a display without flicker can be performed. The counter electrode signal generating circuit 39 generates a signal which is not shown (hereinafter, the signal is referred to as a signal C2), and the signal C2 is supplied to the counter electrodes 5. The voltage value of the signal C2 varies between the gate-on voltage of the TFT 3 and the gate-off voltage of the TFT 3.

The voltage level of the signal B1 is maintained after it is written into each pixel by applying the signal A3 until the signal A3 is applied again for performing the writing in the next frame. The voltage level of the signal B2 changes after the signal A3 is applied to the TFT 3, to a voltage level which is different from the voltage level at the time when the signal A3 is applied, and the voltage level is maintained. Then, the voltage level of the signal B2 changes before the signal A3 for performing the writing in the next frame is applied again. The voltage level of the signal B3 changes after the signal A3 is applied to the TFT 3, to a voltage level which is different from the voltage level at the time when the signal A3 is applied, and the voltage level is maintained until the signal A3 for performing the writing in the next frame is applied again. When the signal A3 for the next frame is applied, the voltage level of the signal B3 change again to a different voltable level.

The signal B1 from the B1 signal generating circuit 33, the signal B2 from the B2 signal generating circuit 34, and the signal B3 from the B3 signal generating circuit 35 are output to three terminals 40a, 40b, and 40c of the switch 40, respectively. The switch 40 selects one of the terminals, 40a, 40h, or 40c, so as to supply one of the selected signal, B1, B2, or B3 to the inspecting terminal 43. The inspecting terminal 43 is in contact with the terminal 9a of the line 9 connected to the source bus lines 2.

The ON/OFF control signal A3 from the gate line signal generating circuit 36 is applied to the inspecting terminal 44. The inspecting terminal 44 is in contact with the terminal 28a of the line 28 for the gate bus lines 1. The OFF control signal A4 from the gate-off voltage signal generating circuit 37 is output to a terminal 41b among three terminals 41a, 41b, and 41c of the switch 41. The signal C1 from the counter electrode signal generating circuit 38 and the signal C2 from the counter electrode signal generating circuit 39 are applied to the remaining two terminals 41a and 41c, respectively. By selecting one of the terminals, 41a, 41b, or 41c, the switch 41 applies one of the signals, C1, A4, or C2, to the inspecting terminal 45. The inspecting terminal 45 is in contact with the terminal 30a for auxiliary capacitances. The above-mentioned signal C1 is output to a terminal 42a of the switch 42, and the signal C2 is output to terminals 42b and 42c. The switch 42 selects one of the three terminals, 42a, 42b, or 42c, so as to apply one of the signals, C1 or C2, to the inspecting terminal 46. The inspecting terminal 46 is in contact with a terminal (not shown) provided for the counter electrodes 5. The control of the switches 40–42 is performed by a control circuit (not shown), and the switches 41 and 42 are cooperatively operated.

Next, an inspecting method for an active matrix substrate shown in FIG. 16 by using the above-mentioned inspecting apparatus will be described. First, the liquid crystal layer of the inspecting apparatus comes in contact with the active matrix substrate to be inspected. In this step, the inspecting terminal 43 is in contact with the terminal 9a for the source bus lines 2, the inspecting terminal 44 is in contact with the terminal 28a for the gate bus lines 1, the inspecting terminal 45 is in contact with the terminal 30a provided on one end of the line 30 for the auxiliary capacitance common line 29, and the inspecting terminal 46 is in contact with the terminal (not shown) for the counter electrodes 5. Thereafter, by switching the switches 40–42, signals applied to the terminal 9a for the source bus lines 2, the terminal 28a for the gate bus lines 1, the terminal 30a for the auxiliary capacitance common line 29, and the terminal for the counter electrodes 5 are selected. In this example, as is shown in Table 2, 6 types of signal combinations are used as inspecting signals (Nos. 101–106).

TABLE 2

| | Cs-On-Common Structure | | | | | |
|---|---|---|---|---|---|---|
| | Source signal is changed at optimum counter voltage | | | Counter electrode voltage can be varied | | Cs line is connected to Gate-off voltage |
| | B1 | B2 | B3 | Gate-off voltage | Gate-on voltage | |
| TFT OFF-failure | ● | ○ | ○ | ● | ● | ● |
| Leakage between source and pixel electrode | ● | ○ | ○ | ● | ● | ● |
| Leakage between electrodes of auxiliary capacitance | ○ | ○ | ○ | ○ | ○ | ● |
| Leakage between gate and drain | ● | ● | ● | ○ | ● | ● |
| Leakage between upper and lower pixel electrodes | ○ | ○ | ○ | ○ | ○ | ○ |
| SW40 | 40a | 40b | 40c | 40a | 40a | 40a |
| SW41, 42 | 41a | 41a | 41a | 41b | 41b | 41c |
| | 42a | 42a | 42a | 42b | 42b | 42c |
| Inspecting signals (No.) | 101 | 102 | 103 | 104 | 105 | 106 |

●: Black spot   ○: Luminous spot

As is seen from Table 2, in the case of the inspecting signal No. 101, the terminal 40a is selected by the switch 40, and the terminals 41a and 42a are selected by the switches 41 and 42. In other words, the inspecting signal No. 101 is a signal combination of A3, B1, and C1. In the case where the terminal 40b is selected by the switch 40, and the terminals 41a and 42a are selected by the switches 41 and 42, the inspecting signal No. 102 is obtained which is a signal combination of A3, B2, and C1. The inspecting signal No. 103 is a signal combination of A3, B3, and C1, in the case where the terminal 40c is selected by the switch 40, and the terminals 41a and 42a are selected by the switches 41 and 42. As is apparent from the above description, in the inspecting signal Nos. 101–103, only the signal applied to the source bus lines 2 is different, but the signals applied to the gate bus lines 1 and the counter electrodes 5 are the same.

When the inspecting signal No. 104 is to be used, the switch 40 selects the terminal 40a, and the switches 41 and 42 select the terminals 41b and 42b. The inspecting signal No. 104 is a signal combination of A3, A4, B1, and C2. In this case, the voltage of the signal C2 corresponds to the gate-off voltage of the TFTs 3. When the inspecting signal No. 105 is to be used, the switch 40 selects the terminal 40a, and the switches 41 and 42 select the terminals 41b and 42b. That is, the inspecting signal No. 105 is a signal combination of A3, A4, B1, and C2. Moreover, when the inspecting signal No. 106 is to be used, the switch 40 selects the terminal 40a, and the switches 41 and 42 select the terminals 41c and 42c. That is, the inspecting signal No. 106 is a signal combination of A3, B1, and C2. The inspecting apparatus of this example uses the above-mentioned six types of inspecting signals Nos. 101–106. In this example, an exemplary case where the display mode is a normally white mode is described.

(A defect due to OFF failure)

Figure 20A:
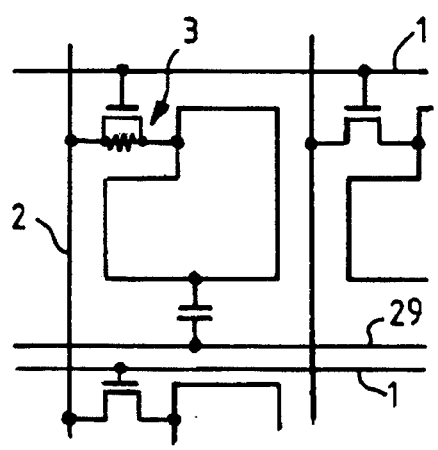
FIG. 20A is a schematic diagram showing a defect due to OFF failure on the active matrix substrate having a Cs-On-Common structure.
Figure 21A:
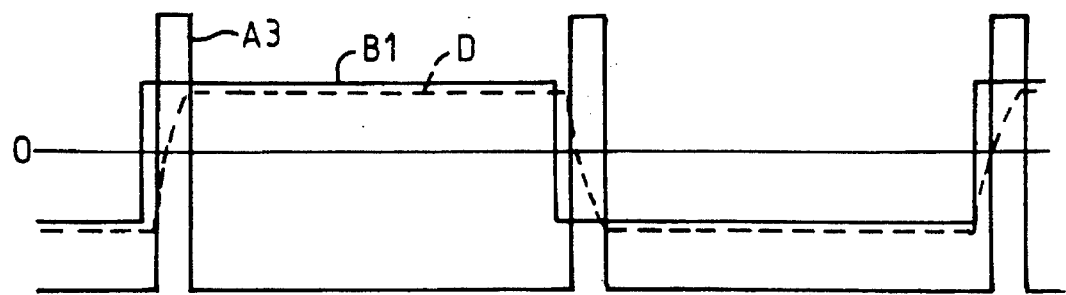
FIGS. 21A to 21C each show a waveform indicating a potential at a drain electrode of a TFT in the case of a defect due to OFF failure.
Figure 21B:
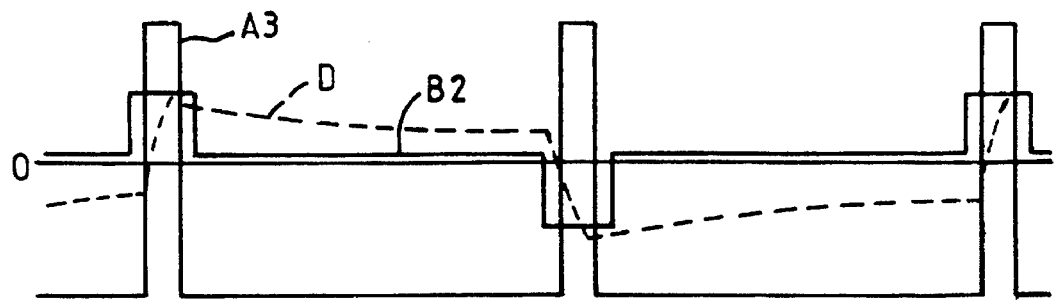
Figure 21C:
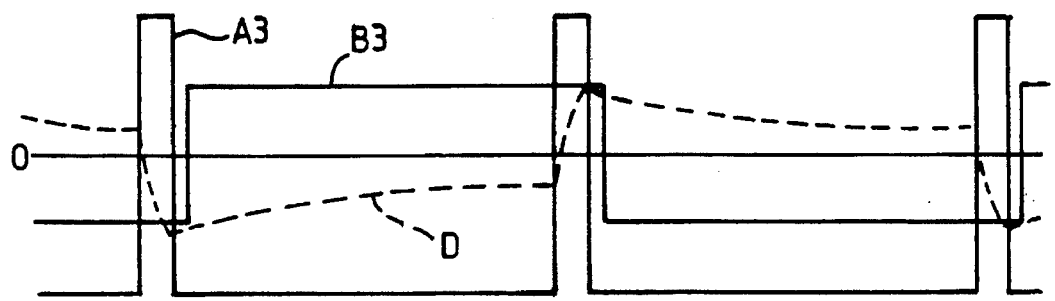

First, the detection of a defect due to OFF failure is described. The defect due to OFF failure is caused by a small amount of leakage between the source electrode and the drain electrode of a TFT 3, as is shown in FIG. 20A. In order to detect such a defect due to OFF failure, the inspecting signals Nos. 101–103 are used, as is shown in FIGS. 21A to 21C. As described above, when the inspecting signals Nos. 101–103 are selected, the signal A3 is applied to the gate bus lines 1, and the signal C1 which is fixed to the optimum counter voltage is applied to the counter electrodes 5. To the source bus lines 2, the signal B1 is applied in the case of the inspecting signal No. 101, the signal B2 is applied in the case of the inspecting signal No. 102, and the signal B3 is applied in the case of the inspecting signal No. 103. When the signals of such a combination are applied under a condition that the counter voltage is adjusted to be optimum, in a defective pixel portion where the OFF characteristics of a TFT 3 are poor, an effective voltage for displaying a black spot is applied to the liquid crystal layer for the inspecting signal No. 101, and an effective voltage for displaying a luminous spot is applied to the liquid crystal layer for the inspecting signals Nos. 102 and 103, as is shown in a region (a) of a small amount of leakage in FIG. 7. As is seen from Table 2, for the inspecting signals Nos. 101–103, the display pattern in the case of the defect due to OFF failure is different from display patterns in the cases of the other types of defects. Therefore, it is possible to identify the occurring defect as a defect due to OFF failure by monitoring the display pattern by eye when the inspecting signals Nos. 101–103 are applied.

Figure 20B:
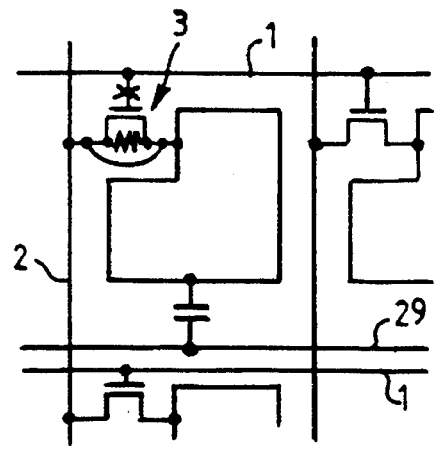
FIG. 20B is a schematic diagram showing the corrected portion.

When a defect due to OFF failure is detected, the correction is performed in the portion of the active matrix substrate where the defect occurs, as is shown in FIG. 20B. First, the gate electrode of the TFT 3 where the above leakage occurs is disconnected from the gate bus line 1. Then, the source electrode and the drain electrode of the TFT 3 are electrically connected to each other. Thus, the correction is completed. The correction can be performed by using a laser beam or the like. In the corrections which will be described below, a laser beam or the like can be applied.

FIGS. 21A to 21C show the waveforms D of the potential at the drain electrode of the TFT 3 for the inspecting signals Nos. 101–103, respectively. The waveforms D are different from those in the cases of the other types of defects. Therefore, instead of monitoring by eye, it is possible to detect the defect due to OFF failure by electrically measuring the potential.

(A defect due to leakage between a pixel electrode and a source bus line)

Figure 22:
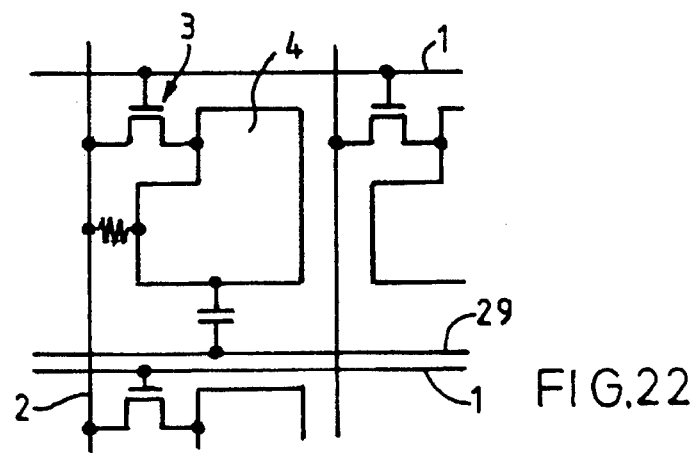
FIG. 22 is a schematic diagram showing a defect due to leakage between the pixel electrode and the source bus line on the active matrix substrate having a Cs-On-Common structure.

This type of defect is caused by a large amount of leakage between a pixel electrode 4 and a source bus line 2, as is shown in FIG. 22. In this case, the same as in the detection of the defect due to OFF failure, the inspecting signals Nos. 101–103 are used. When the inspecting signals Nos. 101–103 are applied under a condition that the counter voltage is adjusted to be optimum, in a portion where a large amount of leakage occurs between the pixel electrode 4 and the source bus line 2, an effective voltage for displaying a black spot is applied to the liquid crystal layer for the inspecting signals Nos. 101 and 103, and an effective voltage for displaying a luminous spot is applied to the liquid crystal layer for the inspecting signal No. 102, as is shown in a region (b) of a large amount of leakage in FIG. 7. Therefore, the black spot is displayed for the inspecting signals Nos. 101 and 103, and the luminous spot is displayed for the inspecting signal No. 102. As is seen from Table 2, for the inspecting signals Nos. 101–103, the display pattern in the case of the defect due to leakage between the pixel electrode 4 and the source bus line 2 is different from display patterns in the cases of the other types of defects. Therefore, it is possible to identify the occurring defect as the defect due to leakage by monitoring the display pattern by eye.

Figure 23A:
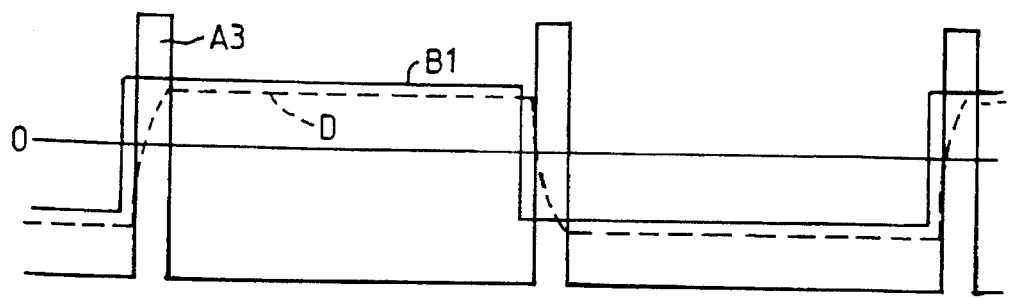
FIGS. 23A to 23C each show a waveform indicating a potential at a drain electrode of a TFT in the case of a defect due to leakage between the pixel electrode and the source bus line.
Figure 23B:
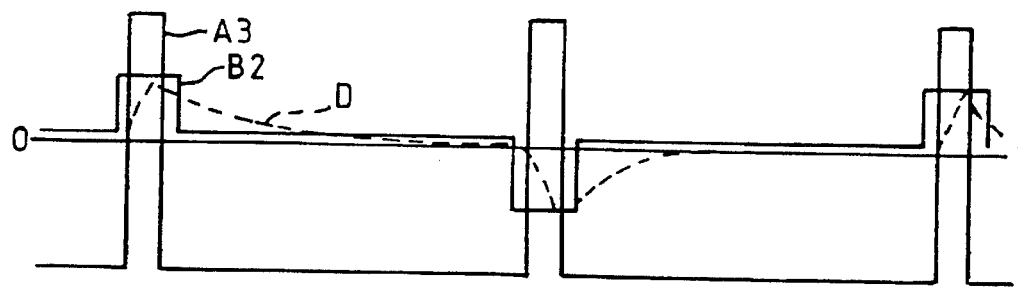
Figure 23C:
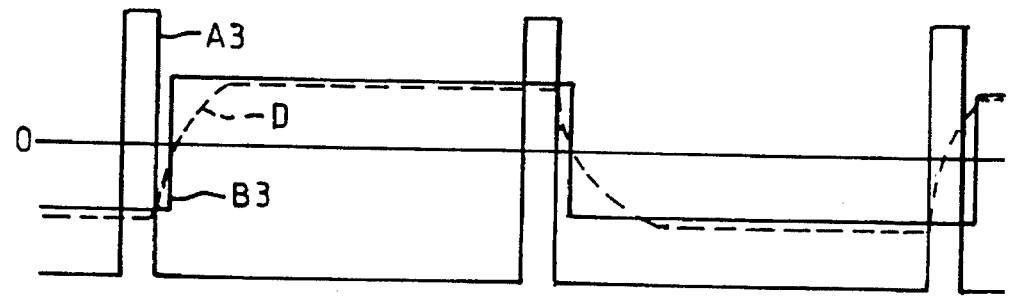

FIGS. 23A to 23C show the waveforms D of the potential at the drain electrode of the TFT 3 for the inspecting signals Nos. 101–103, respectively. The waveforms D are different from those in the cases of the other types of defects. Therefore, instead of monitoring by eye, it is possible to detect the defect due to leakage by electrically measuring the potential at the drain electrode of the TFT 3.

In this case, even if the active matrix substrate to be inspected is actually assembled to be an active matrix display apparatus, and the active matrix display apparatus is actually driven, the pixel in the portion where the above leakage occurs cannot be observed as a defect. Accordingly, this type of defect is not corrected.

(A pixel defect due to leakage between electrodes of an auxiliary capacitance)

Figure 24A:
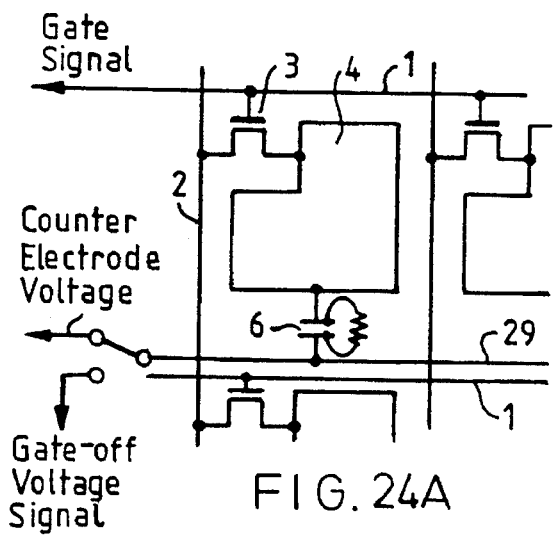
FIG. 24A is a schematic diagram showing a pixel defect due to leakage between electrodes of an auxiliary capacitance on the active matrix substrate having a Cs-On-Common structure.

This type of defect is caused by a leakage between one electrode of an auxiliary capacitance 6 provided in parallel with a pixel capacitance and the other electrode of the auxiliary capacitance 6 connected to the common line 29, as is shown in FIG. 24A. In this case, unlike the above two cases, the inspecting signals Nos. 101–103 cannot be used for the inspection, but the inspecting signals Nos. 104–106 are used. When the inspecting signals Nos. 104 and 105 are selected, the switch 41 selects the terminal 41b, so that the signal A4 is applied from the gate-off voltage signal generating circuit 37 to the auxiliary capacitance common line 29. The switch 42 selects the terminal 42b, so that the signal C2 is applied to the counter electrodes 5. If the voltage of the signal C2 is equal to the gate-off voltage of the TFT 3, i.e., if the inspecting signal No. 104 is selected, a luminous spot is displayed in a portion where a leakage occurs between the electrodes constituting the auxiliary capacitance 6. If the voltage of the signal C2 is equal to the gate-on voltage of the TFT 3, i.e., if the inspecting signal No. 105 is selected, a black spot is displayed. When the inspecting signal No. 106 is selected, the switches 41 and 42 select the terminals 41c and 42c, respectively. As a result, the auxiliary capacitance common lines 29 are connected to the counter electrodes 5, and the signal C2 is applied to the auxiliary capacitance common lines 29 and the counter electrodes 5. When the voltage of the signal C2 is changed from the gate-off voltage of the TFT 3 to the gate-on voltage of the TFT 3, a luminous spot is displayed for every voltage in a portion where a leakage occurs between the electrodes constituting the auxiliary capacitance 6. As is seen from Table 2, for the inspecting signals Nos. 104–106, the display pattern is different from display patterns in the cases of the other types of defects. Therefore, it is possible to identify the occurring defect as a defect due to leakage between electrodes of the auxiliary capacitance by monitoring the display pattern by eye when the inspecting signals Nos. 104–106 are applied.

Figure 24B:
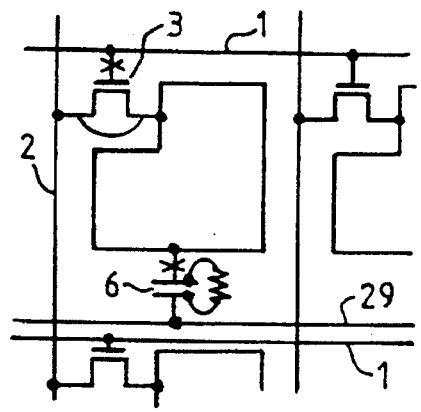
FIG. 24B is a schematic diagram showing the corrected portion.

A defect due to leakage between the electrodes of an auxiliary capacitance is corrected in the following manner, as is shown in FIG. 24B. First, in the portion of the defective pixel due to leakage, the gate electrode of the TFT 3 is disconnected from the gate bus line 1. Then, the source electrode and the drain electrode of the TFT 3 are connected to each other. In addition, the electrode of the auxiliary capacitance 6 is disconnected from the auxiliary capacitance common line 29.

Figure 25:
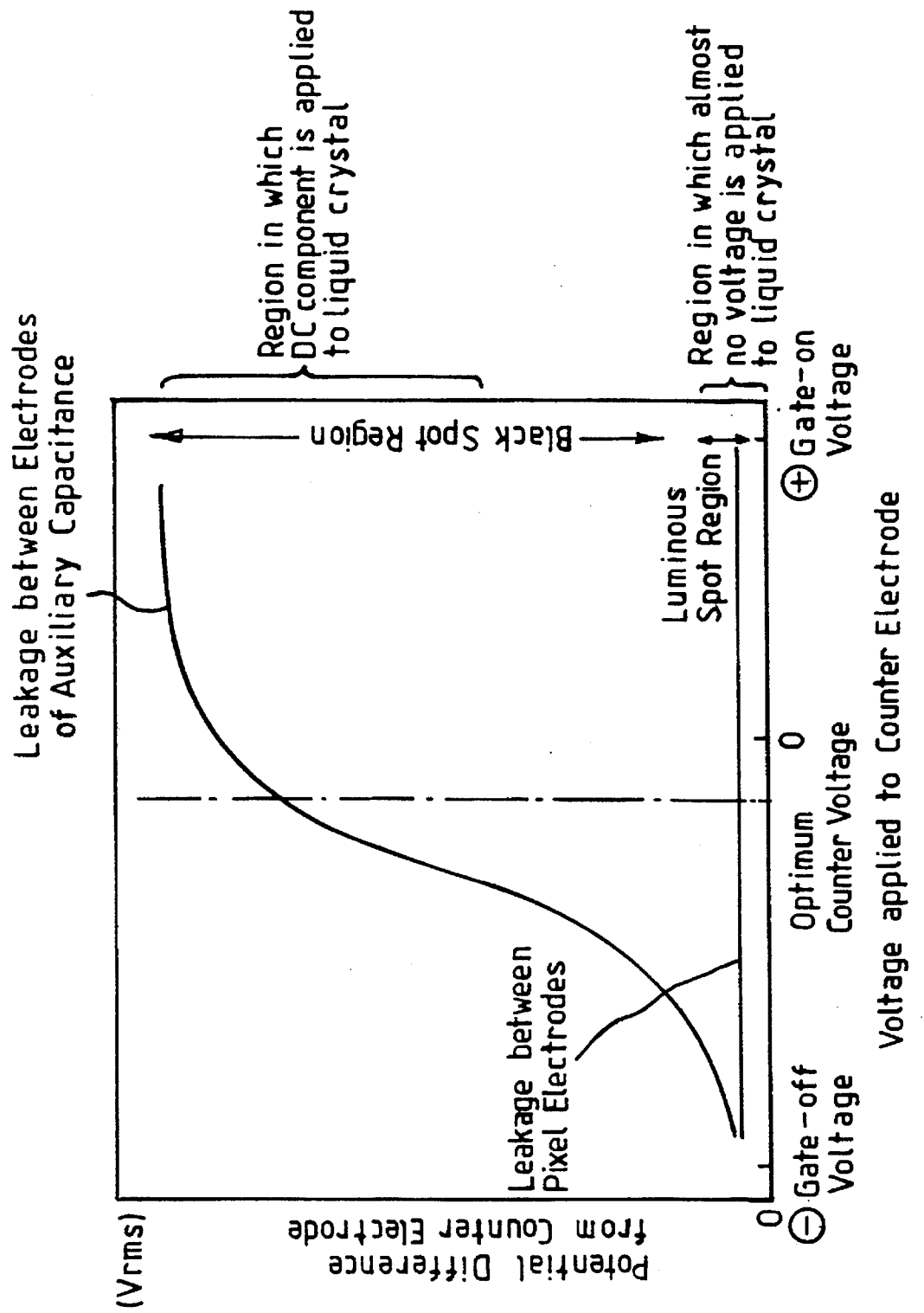
FIG. 25 shows a waveform indicating a potential difference from the counter electrode for the inspecting signal No. 106 in the case of a defect due to leakage between electrodes of the auxiliary capacitance.

As is seen from FIG. 25, the potential difference from the counter electrode for the inspecting signal No. 106 is different from that in the case of the other defect type. Therefore, instead of the monitoring by eye, it is possible to detect a defect of this type by electrically measuring the potential difference from the counter electrode.

As is described in Example 1, for a normal pixel shown by a curve L1 in FIG. 12, a voltage for displaying a black spot is applied to the liquid crystal layer while various inspecting signals Nos. 104–106 are applied. On the other hand, for a defective pixel shown by a curve L2, the voltage for displaying a black spot as well as the voltage for displaying a luminous spot may by applied to the liquid crystal layer while various inspecting signals Nos. 104–106 are applied. Accordingly, the pixel defect due to leakage between the electrodes of the auxiliary capacitance is detected based on the above curve L2. A pixel defect due to leakage between the gate electrode and the drain electrode of the TFT which is described below can be detected in the same manner.

(A pixel defect due to leakage between a counter electrode and a pixel electrode)

This type of defect is caused when the counter electrode 5 and the pixel electrode 4 are electrically connected to each other. In this case, as is seen from Table 2, the display is always a luminous spot for all the inspecting signals Nos. 101–106. This display pattern is different from display patterns in the cases of the other types of defects. Therefore, it is possible to detect a pixel defect due to leakage between the counter electrode 5 and the pixel electrode 4. Such a pixel defect caused by foreign material between the counter electrode 5 and the pixel electrode 4 can be corrected by finding the defective portion by monitoring by eye, and then by performing repair work depending on the types of the defective condition.

(A defect due to leakage between the gate electrode and the drain electrode of a TFT)

This type of defect is caused by a leakage between the gate electrode and the drain electrode of a TFT 3 for driving a pixel, as is shown in FIG. 26A. In this case, the inspecting signals Nos. 101–103 cannot be used for the inspection, but the inspecting signals Nos. 104 and 106 are used. When the inspecting signal No. 4 is selected, the signal A4 is applied from the gate-off voltage signal generating circuit 37 to the auxiliary capacitance common lines 29. To the counter electrodes 5, the signal C2 having the gate-off voltage of the TFT 3 is applied from the counter electrode signal generating circuit 39. When such signals are applied, the pixel in a portion where leakage occurs between the gate electrode and the drain electrode of the TFT 3 displays a luminous spot. When the inspecting signal No. 106 is selected, the auxiliary capacitance common lines 29 are connected to the counter electrodes 5, and the signal C2 is applied to the auxiliary capacitance common lines 29 and the counter electrodes 5. At this time, the voltage of the signal C2 is changed from the gate-off voltage of the TFT 3 to the gate-on voltage of the TFT 3. Unlike the above pixel defect due to leakage between the electrodes of an auxiliary capacitance, only when the voltage of the signal C2 is the gate-off voltage of the TFT 3, a luminous spot is displayed for the inspecting signal No. 106. As is seen from Table 2, the display pattern is different from display patterns in the cases of the other types of defects. Therefore, it is possible to identify the occurring defect as a defect due to leakage between the gate electrode and the drain electrode of the TFT 3 by monitoring the display pattern by eye.

The defect due to leakage between the gate electrode and the drain electrode of the TFT 3 is corrected in the following manner, as is shown in FIG. 26B. First, the gate electrode of the TFT 3 at which the leakage occurs is disconnected from the gate bus line 1, and the source electrode and the drain electrode of the TFT 3 are connected to each other.

As is seen from FIG. 25, the potential difference from the counter electrode for the inspecting signal No. 106 is different from that in the case of the other defect type. Therefore, instead of the monitoring by eye, it is possible to detect the defect of this type by electrically measuring the potential difference from the counter electrode.

(A line defect due to leakage between a gate bus line and a source bus line)

This type of defect is caused by a leakage between the gate bus line 1 and the source bus line 2, as is shown in FIG. 27A. The line defect is observed on a display as a cross because display failure occurs in the pixel electrodes in a row connected to the gate bus line 1 where the leakage occurs and in the pixel electrodes in a column connected to the source bus line 2 where the leakage occurs.

When such a defect occurs, the difference between the gate-off voltage of the TFT 3 and the gate-on voltage of the TFT 3 is made smaller because of the influence by the signal supplied to the source bus line 2 as compared with a case where there occurs no defect. Accordingly, both a desired value of an on resistance and a desired value of an off resistance of the TFT 3 cannot be maintained. Therefore, the TFT 3 which is connected to the source bus line 2 and the gate bus line 1 between which a leakage occurs operates apparently the same as the TFT 3 of OFF failure. For detecting such a defect, the inspecting signals Nos. 101 and 103 are used. The line in the horizontal direction based on the pixel electrodes connected to the gate bus line 1, the line appearing as a line defect, is more clearly observed in the case of the application of the inspecting signal No. 103, as compared with the case of the application of the inspecting signal No. 101. At this time, the line in the vertical direction based on the pixel electrodes connected to the source bus line 2 is also clearly observed. Therefore, the defective portion can be specified on the basis of the crossing lines which clearly appear.

The correction for such a defect is performed in the following manner, as is shown in FIG. 27B. Both the sides of the portion of the source bus line 2 where the leakage occurs are cut, and the signal is applied to both the ends of the corresponding source bus line 2.

Figure 28A:
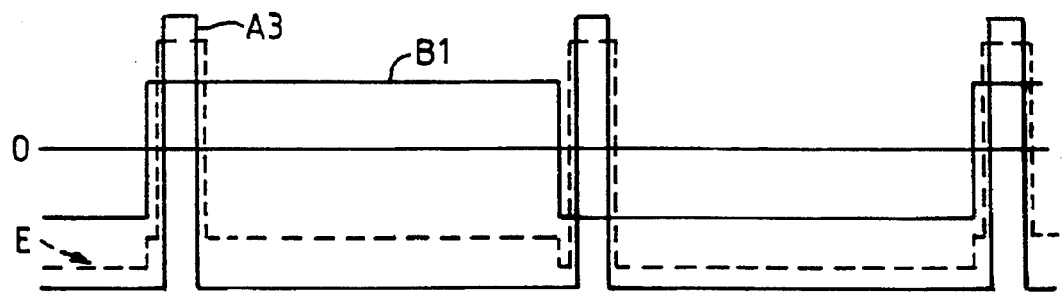
FIGS. 28A to 28C each show a waveform of a gate signal in the case of a line defect due to leakage between the gate bus line and the source bus line.
Figure 28B:
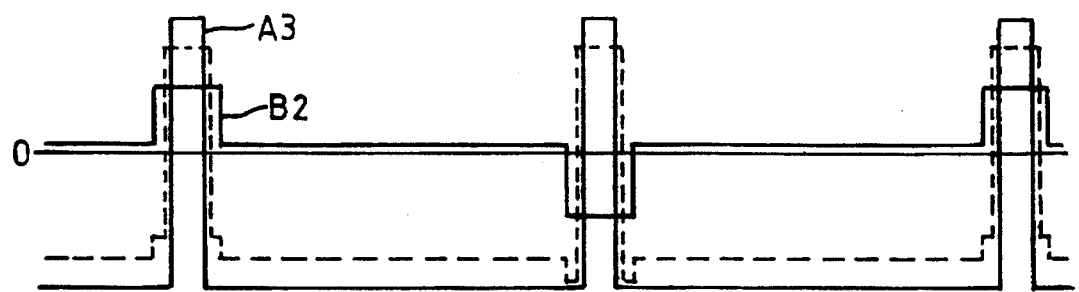
Figure 28C:
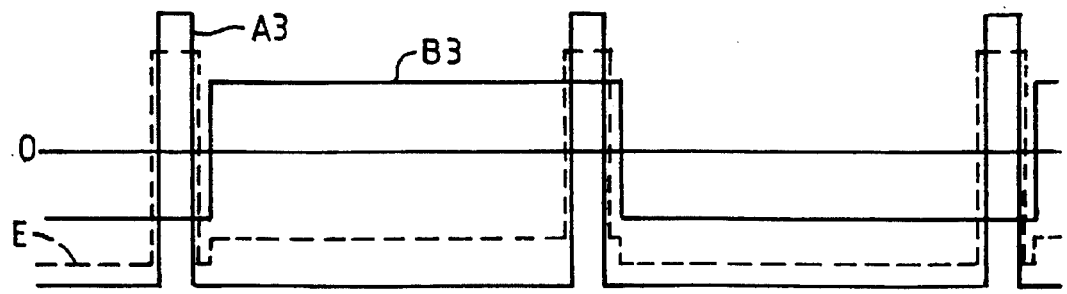
Figure 29:
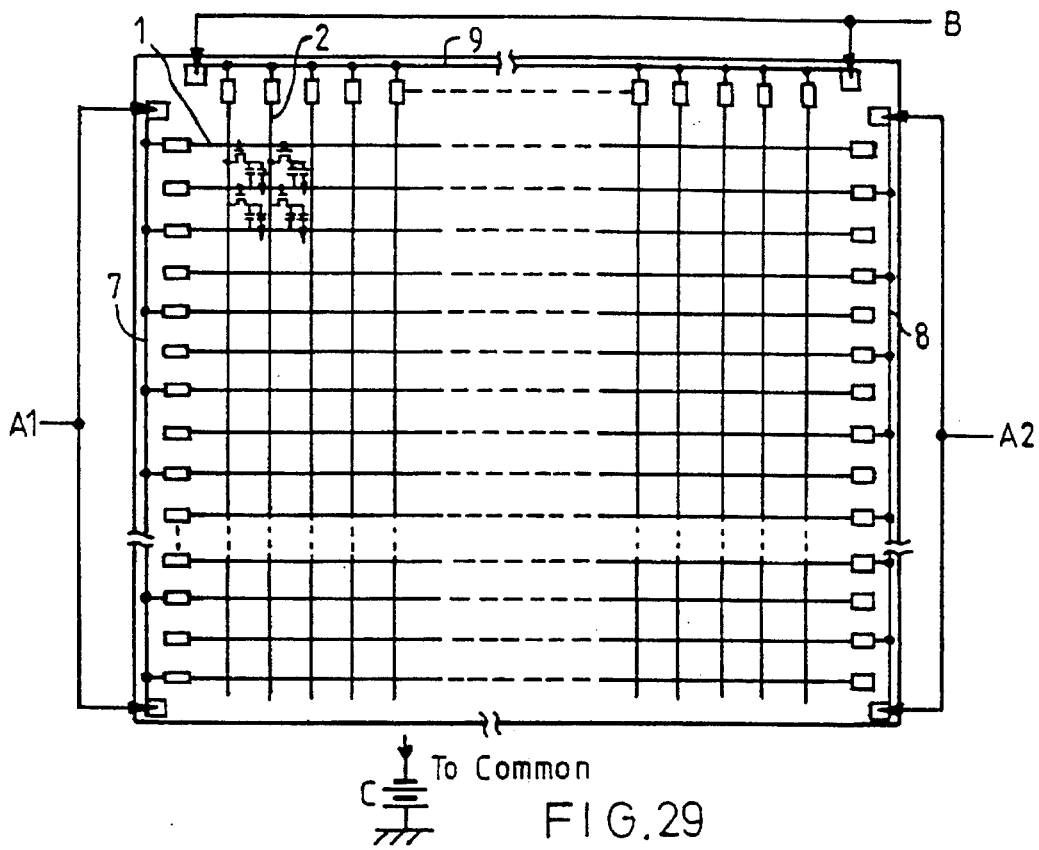
FIG. 29 is a schematic diagram showing the signal application according to a conventional inspecting method together with an active matrix substrate having a Cs-On-Gate structure.
Figure 30:
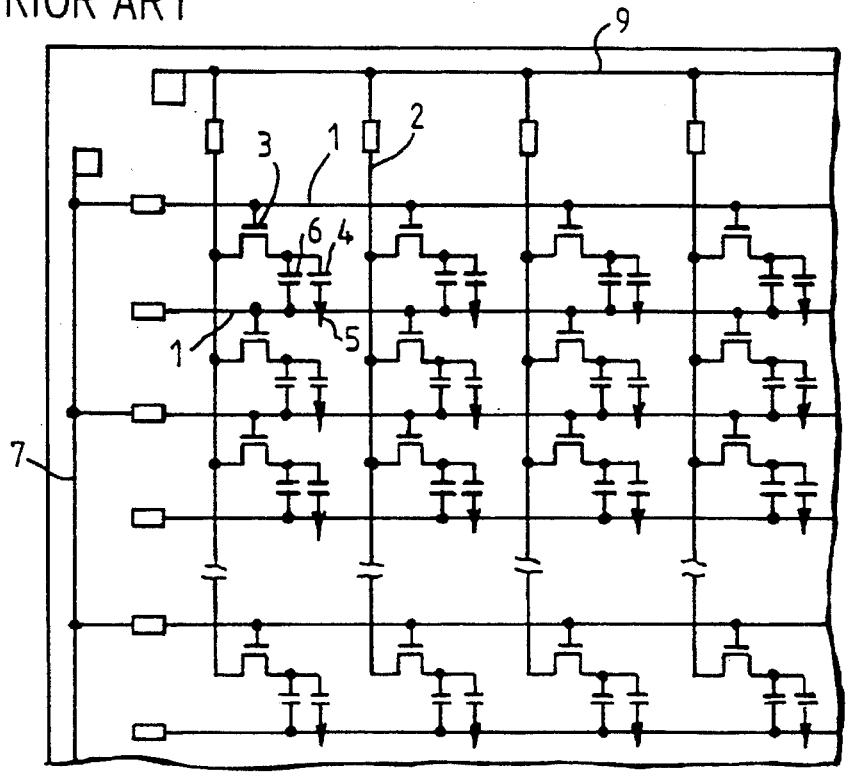
FIG. 30 is an enlarged plan view showing part of the active matrix substrate having the Cs-On-Gate structure shown in FIG. 29.
Figure 31:
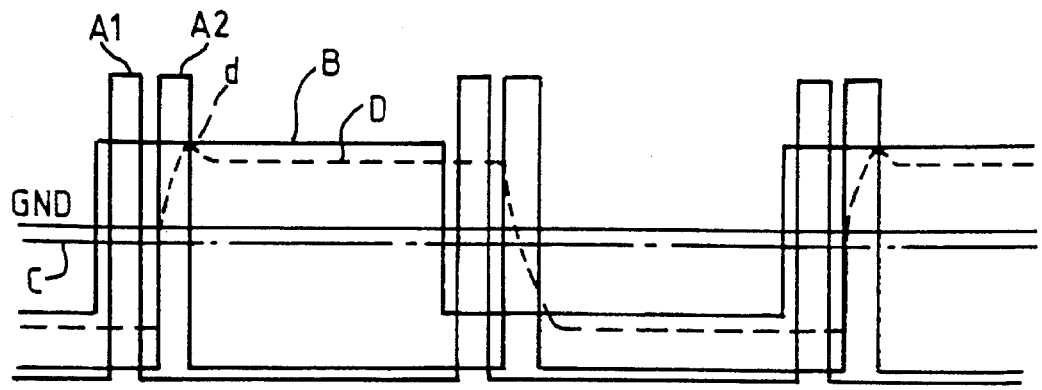
FIG. 31 shows a waveform of a signal used in the conventional inspecting method which is applied to the active matrix substrate having the Cs-On-Gate structure.
Figure 32:
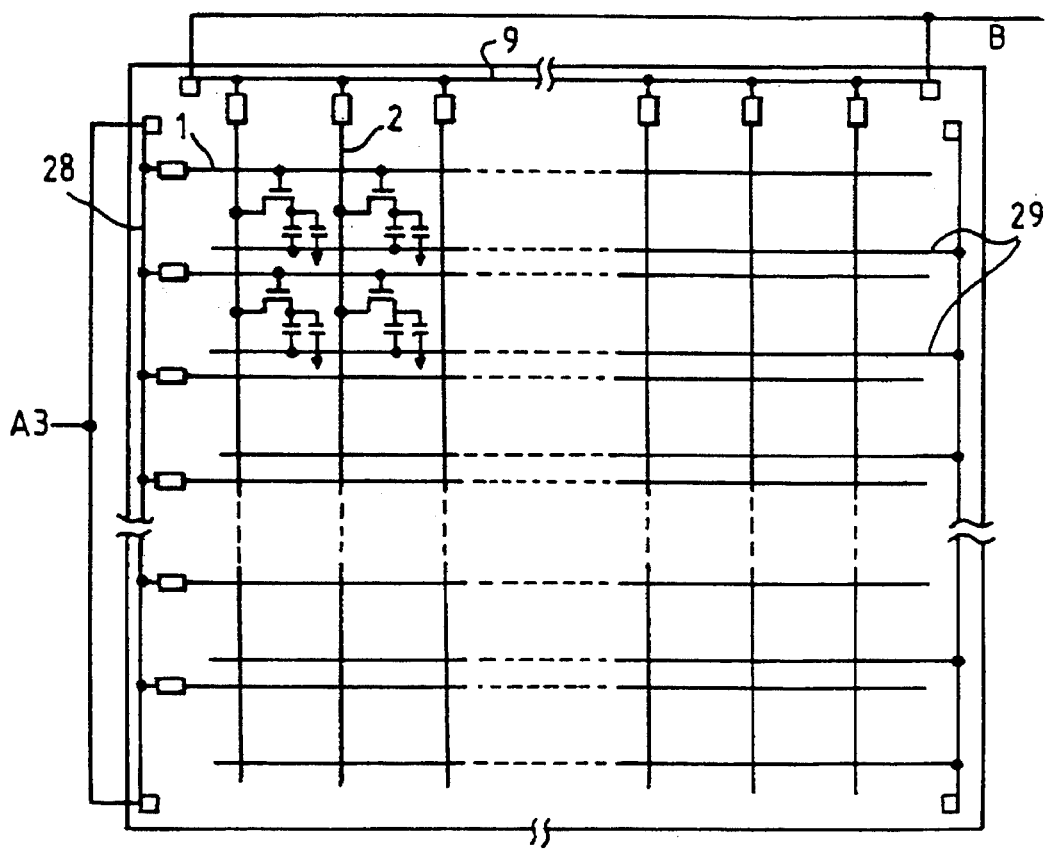
FIG. 32 is a schematic diagram showing the signal application according to a conventional inspecting method together with an active matrix substrate having a Cs-On-Common structure.
Figure 33:
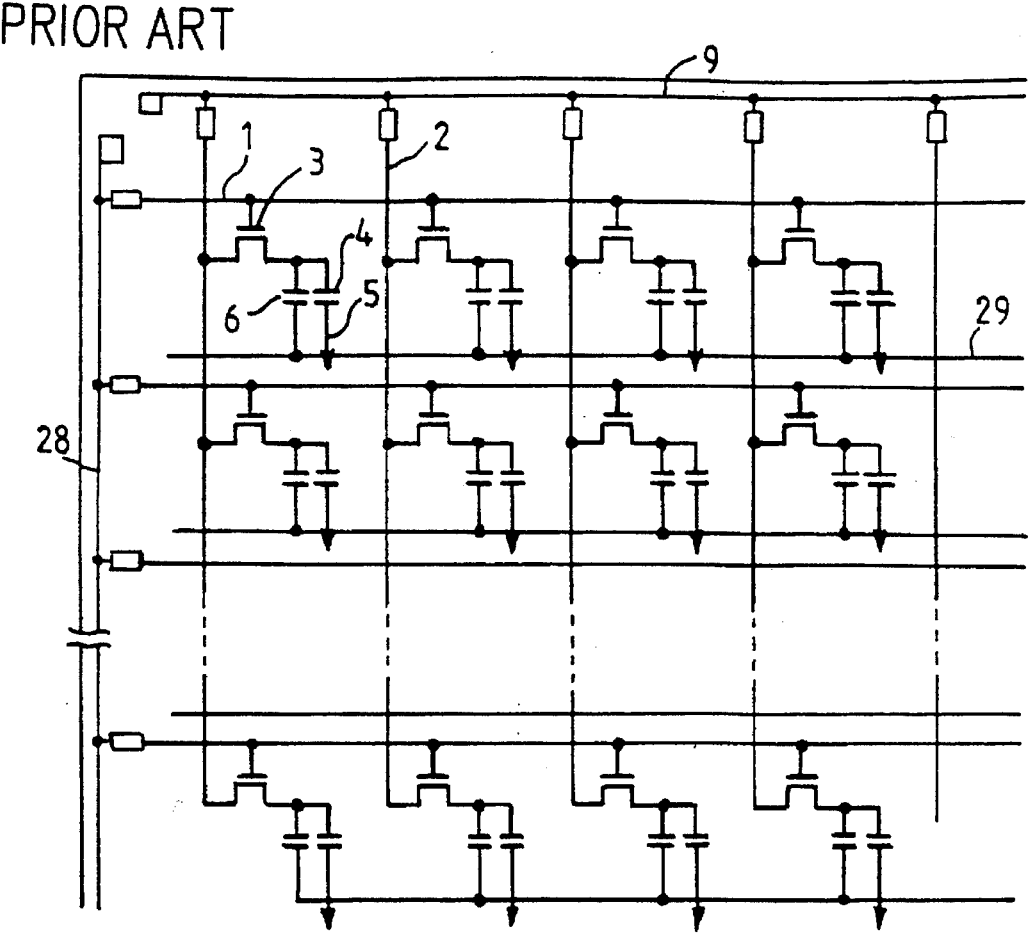
FIG. 33 is an enlarged plan view showing part of the active matrix substrate having the Cs-On-Common structure shown in FIG. 32.
Figure 34:
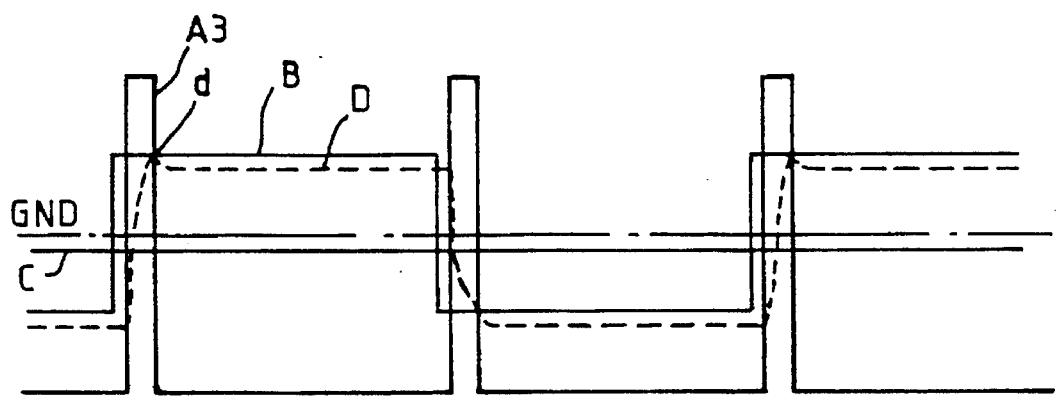
FIG. 34 shows a waveform of a signal used in the conventional inspecting method which is applied to the active matrix substrate having the Cs-On-Common structure.

In a case where the leakage occurs between the gate bus line 1 and the source bus line 2, the waveforms E of the signal applied to the gate electrode of the TFT 3 are as shown in FIGS. 28A to 28C, respectively, which are different from those in the cases of the other types of defects. Accordingly, it is possible to detect the defect by electrically measuring the potential, instead of the monitoring by eye.

As is understood from the above description, according to the present invention, a defect due to OFF failure of a TFT and a defect due to leakage which could not be conventionally detected before the gate driver IC for performing the actual driving is mounted can be detected, and the type of the defects can be specified. Moreover, the detected defects can be corrected. Accordingly, the non-defective ratio of the active matrix substrate can be improved, and the yield thereof can be improved. It is appreciated that, according to the present invention a defect due to ON failure can also be detected.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An inspecting method, for an active matrix substrate including:

an insulating substrate;

a first line formed on said insulating substrate;

a second line crossing said first line;

a pixel electrode provided in an area enclosed by said first line, an adjacent first line thereto, said second line, and an adjacent second line thereto;

a switching element for driving said pixel electrode connected to said pixel electrode and said first line; and a pair of electrodes constituting an auxiliary capacitance, one of said pair of electrodes being connected to said pixel electrode, the other one being connected to said adjacent first line, said method comprising the steps of:

disposing a counter substrate, having a face on which a counter-electrode is formed, so that said face faces said active matrix substrate with a liquid crystal layer interposed therebetween, connecting signal-supplying terminals to said first line, to said adjacent first line, to said second line and to said counter-electrode; and a detection step of detecting a defect on said active matrix substrate by performing at least one of a first signal generating step, a second signal generating step, and a third signal generating step, said first signal generating step including applying, to said first line, alternately, an ON signal for turning on said switching element, and an OFF signal for turning off said switching element, and applying, to said second line, a first detecting signal having a voltage which changes before said ON signal is applied to said first line, said second signal generating step including applying, to said first line, alternately, said ON signal and said OFF signal and applying, to said second line, a second detecting signal having a voltage which changes before and after said ON signal is applied to said first line, said third signal generating step including applying to said first line, alternately, said ON signal and said OFF signal following said ON signal, and applying, to said second line, a third detecting signal having a voltage which changes to a level after said ON signal is applied to said first line, the level being maintained until said ON signal is next applied to said first line.

2. An inspecting method, for an active matrix substrate, according to claim 1, wherein said detection step includes detecting a defect on said active matrix substrate by additionally performing at least one of a fourth signal generating step, a fifth signal generating step and a sixth signal generating step, said fourth signal generating step including applying to said counter-electrode a detecting signal, having the voltage of said ON signal applied to said first line, said fifth signal generating step including applying, to said counter-electrode, a detecting signal having the voltage of said OFF signal applied to said first line, said sixth signal generating step including electrically connecting, to said counter-electrode, said adjacent first line, and applying, to said counter-electrode, a detecting signal having a voltage changing between the voltage of said ON signal and the voltage of said OFF signal applied to said first line.

3. A defect-correcting method for an active matrix substrate including an insulating substrate; a first line formed on said insulating substrate; a second line crossing said first line; a pixel electrode provided in an area enclosed by said first line, an adjacent first line thereto, said second line, and an adjacent second line thereto; a switching element driving said pixel electrode, connected to said pixel electrode and to said first line; and a pair of electrodes constituting an auxiliary capacitance, one of said pair of electrodes being connected to said pixel electrode, the other one being connected to said adjacent first line, said method comprising:

a step of disposing a counter substrate having a face on which a counter-electrode is formed so that said face faces said active matrix substrate with a liquid crystal layer interposed therebetween, and connecting signal-supplying terminals to said first line, said adjacent first line, said second line, and said counter-electrode;

a detection step of detecting a defect on said active matrix substrate by performing at least one of a first signal generating step, a second signal generating step, and a third signal generating step, said first signal generating step including alternately applying, to said first line, an ON signal for turning on said switching element and an OFF signal for turning off said switching element and applying, to said second line, a first detecting signal having a voltage which changes before said ON signal is applied to said first line, said second signal generating step including applying, to said first line, alternately, applying said ON signal and said OFF signal and applying, to said second line, a second detecting signal having a voltage which changes before and after said ON signal is applied to said first line, said third signal generating step including applying to said first line, alternately, said ON signal and said OFF signal following said ON signal, and applying, to said second line, a third detecting signal having a voltage which changes to a level after said ON signal is applied to said first line, the level being maintained until said ON signal is next applied to said first line; and a correction step of correcting the detected defect.

4. A defect-correcting method, for an active matrix substrate, according to claim 3, wherein said detection step includes detecting a defect on said active matrix substrate by additionally performing at least one of a fourth signal generating step, a fifth signal generating step, and a sixth signal generating step, said fourth signal generating step including applying, to said counter-electrode, a detecting signal having the voltage of said ON signal applied to said first line, said fifth signal generating step including applying, to said counter-electrode, a detecting signal having the voltage of said OFF signal applied to said first line, said sixth signal generating step including electrically connecting said adjacent first line to said counter electrode and applying a detecting signal to said counter electrode having a voltage changing between the voltage of said ON signal and the voltage of said OFF signal applied to said first line.

5. An inspecting method for an active matrix substrate according to claim 1, wherein said first line and said adjacent first line are both scanning lines, and said second line and said adjacent second line are both signal lines.

6. A defect correcting method for an active matrix substrate according to claim 3, wherein said first line and said adjacent first line are both scanning lines, and said second line and said adjacent second line are both signal lines.

7. An inspecting method for an active matrix substrate according to claim 1, wherein said first line is a scanning line, said adjacent first line is a common line to which said other electrode of said auxiliary capacitance is connected, and said second line and said adjacent second line are both signal lines.

8. A defect correcting method for an active matrix substrate according to claim 3, wherein said first line is a scanning line, said adjacent first line is a common line to which said other electrode of said auxiliary capacitance is connected, and said second line and said adjacent second line are both signal lines.

9. An inspecting apparatus for an active matrix substrate, including an insulating substrate;

a plurality of first lines formed on said insulating substrate;

a plurality of second lines crossing said first lines;

a respective pixel electrode provided in an area enclosed by each first line, an adjacent first line thereto, each second line, and an adjacent second line thereto;

a respective switching element, for driving said respective pixel electrode, connected to said pixel electrode and to said first line; and a respective pair of electrodes constituting an auxiliary capacitance, one of said pair of electrodes being connected to said respective pixel electrode, the other one being connected to said adjacent first line, said apparatus comprising:

a counter substrate, having a face on which a counter electrode is formed, said counter substrate being disposed so that said face faces said active matrix substrate;

a liquid crystal layer formed on said face of said counter substrate, and, in use, interposed between said counter substrate and said active matrix substrate;

ON/OFF signal generating means for generating at least one alternating sequence of an ON signal and an OFF signal, applied to said first lines and to said adjacent first lines, said ON signal turning on each switching element to which it is applied, said OFF signal turning off each switching element to which it is applied, said OFF signal following in sequence said ON signal;

first signal generating means for generating a first detecting signal applied to said second line, said first detecting signal having a voltage which changes before said ON signal is applied to said first lines;

second signal generating means for generating a second detecting signal applied to said second line, said second detecting signal having a voltage which changes before and after said ON signal is applied to said first lines; and third signal generating means for generating a third detecting signal applied to said second line, said third detecting signal having a voltage which changes after said ON signal is applied to said first lines.

10. An inspecting apparatus for an active matrix substrate according to claim 9, further comprising:

fourth signal generating means for generating a fourth detecting signal having the voltage of said ON signal, said fourth detecting signal being applied to said counter electrode, fifth signal generating means for generating a fifth detecting signal having the voltage of said OFF signal, said fifth detecting signal being applied to said counter electrode, and sixth signal generating means for electrically connecting said adjacent first line to said counter electrode and for generating a sixth detecting signal having a voltage changing between the voltage of said ON signal and the voltage of said OFF signal, said sixths detecting signal being applied to said adjacent first lines.

11. An inspecting apparatus for an active matrix substrate according to claim 9, wherein said first line and said adjacent first line are both scanning lines, and said second line and said adjacent second line are both signal lines.

12. An inspecting apparatus for an active matrix substrate according to claim 9, wherein said first line is a scanning line, said adjacent: first line is a common line to which said other electrode of said auxiliary capacitance is connected, and said second line and said adjacent second line are both signal lines.

\* \* \* \* \*